United States Patent
Bullock et al.

(10) Patent No.: US 7,631,413 B2
(45) Date of Patent: Dec. 15, 2009

(54) METHOD OF MANUFACTURING OF AN ARMATURE WINDING FOR ELECTRO-MECHANICAL MACHINES

(75) Inventors: Ronald D. Bullock, So. Barrington, IL (US); Edmund P. Henke, Lake Geneva, WI (US); Boris Zlotin, West Bloomfield, MI (US); Alla Zusman, West Bloomfield, MI (US); Peter Ulan, Wolverine Lake, MI (US); Vladimir Gerasimov, West Bloomfield, MI (US); Vladimir Proseanic, West Bloomfield, MI (US)

(73) Assignee: Bison Gear & Engineering Corporation, St. Charles, IL (US)

( * ) Notice: Subject to any disclaimer, the term of this patent is extended or adjusted under 35 U.S.C. 154(b) by 158 days.

(21) Appl. No.: 11/279,041

(22) Filed: Apr. 7, 2006

(65) Prior Publication Data

US 2007/0089284 A1    Apr. 26, 2007

Related U.S. Application Data

(60) Provisional application No. 60/669,735, filed on Apr. 8, 2005.

(51) Int. Cl.
*H02K 15/00* (2006.01)
*H02K 15/14* (2006.01)
*H02K 15/16* (2006.01)

(52) U.S. Cl. .................. 29/596; 29/592.1; 29/602.1; 29/605; 29/606; 29/598; 310/179; 310/184; 310/201; 310/208

(58) Field of Classification Search ............... 29/592.1, 29/596, 602.1, 605, 606, 598; 310/179, 184, 310/201, 208
See application file for complete search history.

(56) References Cited

U.S. PATENT DOCUMENTS

| | | | |
|---|---|---|---|
| 4,841,267 A * | 6/1989 | Watabe et al. | 335/210 |
| 4,864,715 A | 9/1989 | Sadier | |
| 5,065,064 A | 11/1991 | Kaminski | |
| 6,278,213 B1 | 8/2001 | Bradfield | |
| 2004/0261256 A1 | 12/2004 | Sadiku | |

FOREIGN PATENT DOCUMENTS

GB    2052884    1/1981

\* cited by examiner

*Primary Examiner*—Paul D Kim
(74) *Attorney, Agent, or Firm*—Vedder Price, P.C.

(57) ABSTRACT

A method of manufacturing armature windings for an electro-mechanical machine, includes manufacturing a band of conductor elements with at least one layer, formation of windings on a tool and installation of the windings into an armature. The method results in a highly uniform winding, increased fill percentage in slots, improved electrical efficiency, lower material cost and labor consumption for manufacturing and complete automation of production.

12 Claims, 51 Drawing Sheets

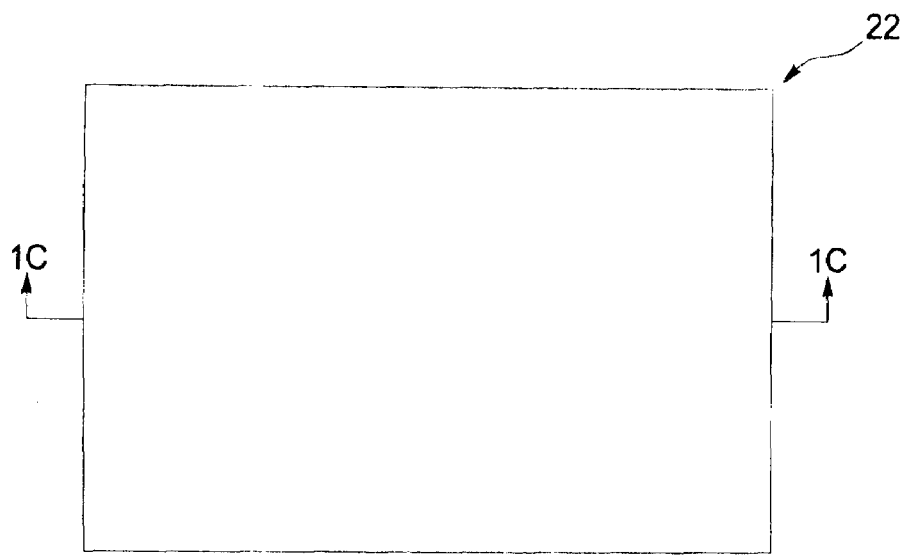
FIG. 1A
FIG. 1C
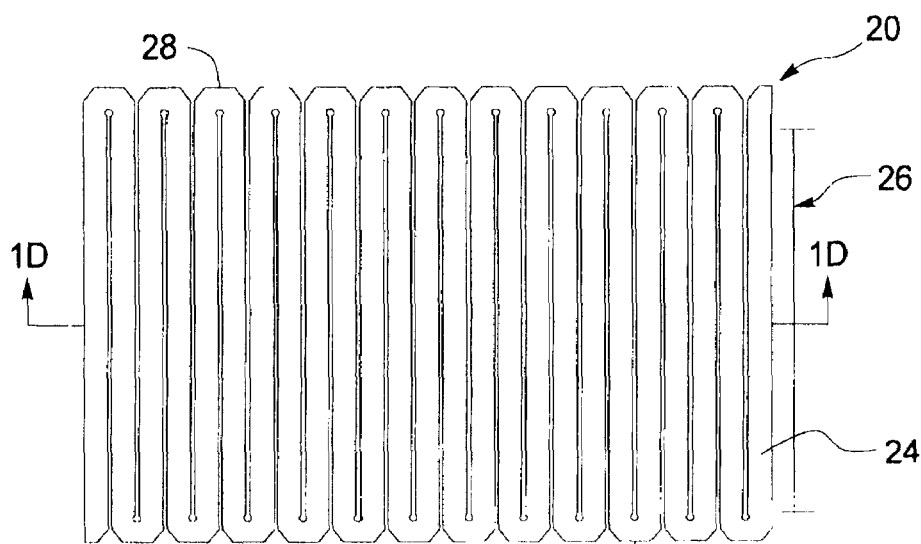
FIG. 1B
FIG. 1D

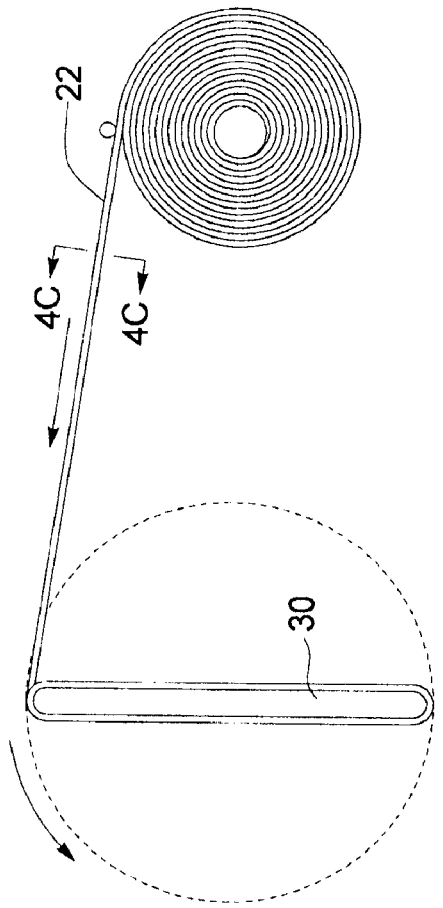
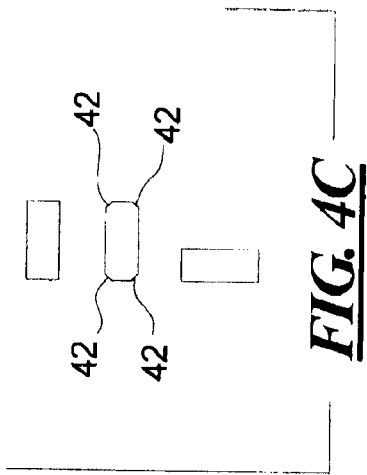
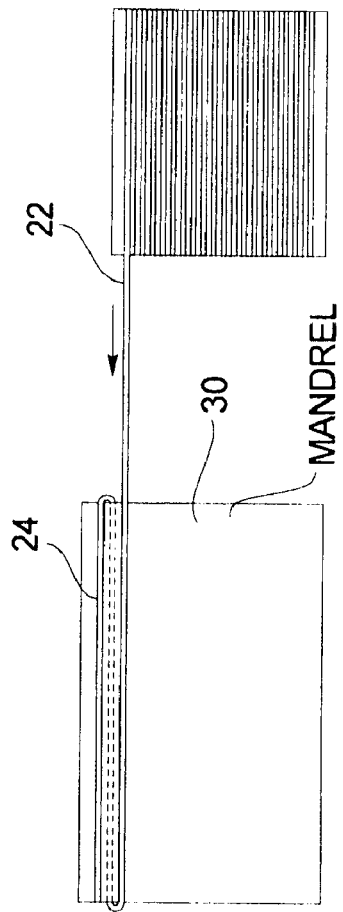
FIG. 4A
FIG. 4C
FIG. 4B

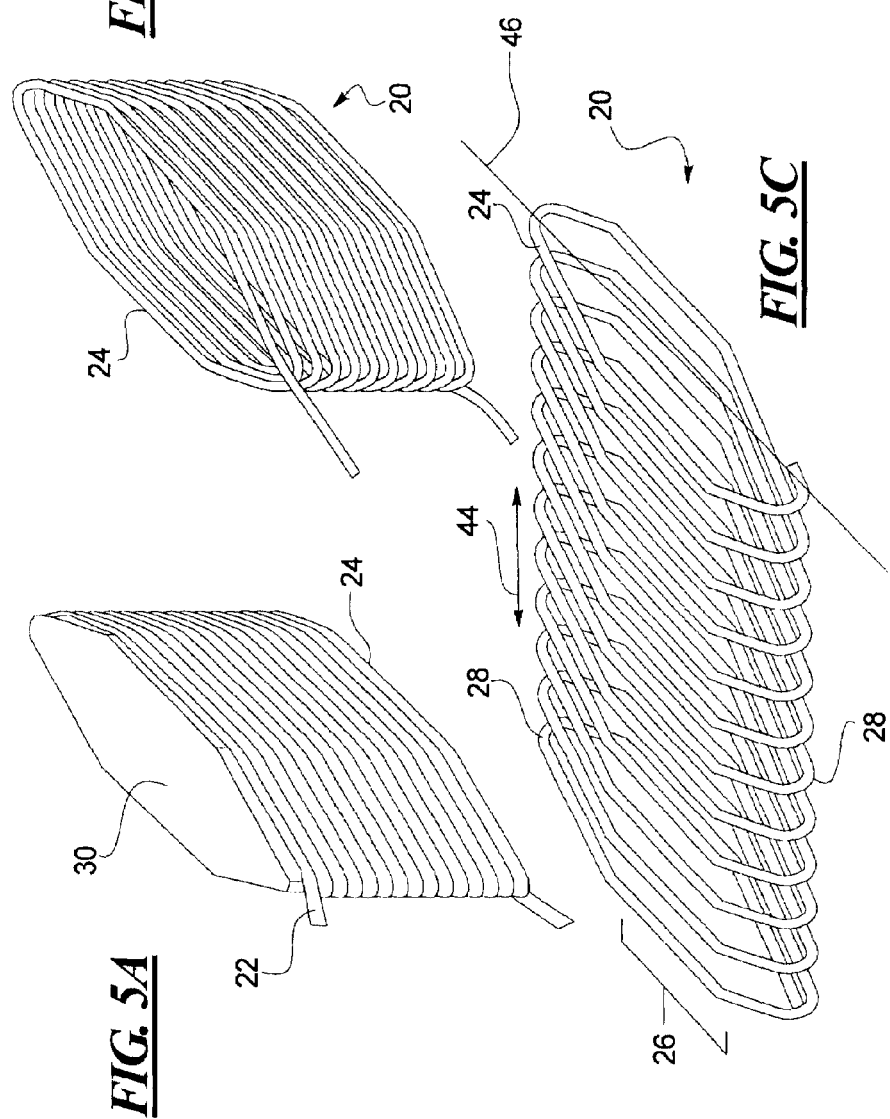

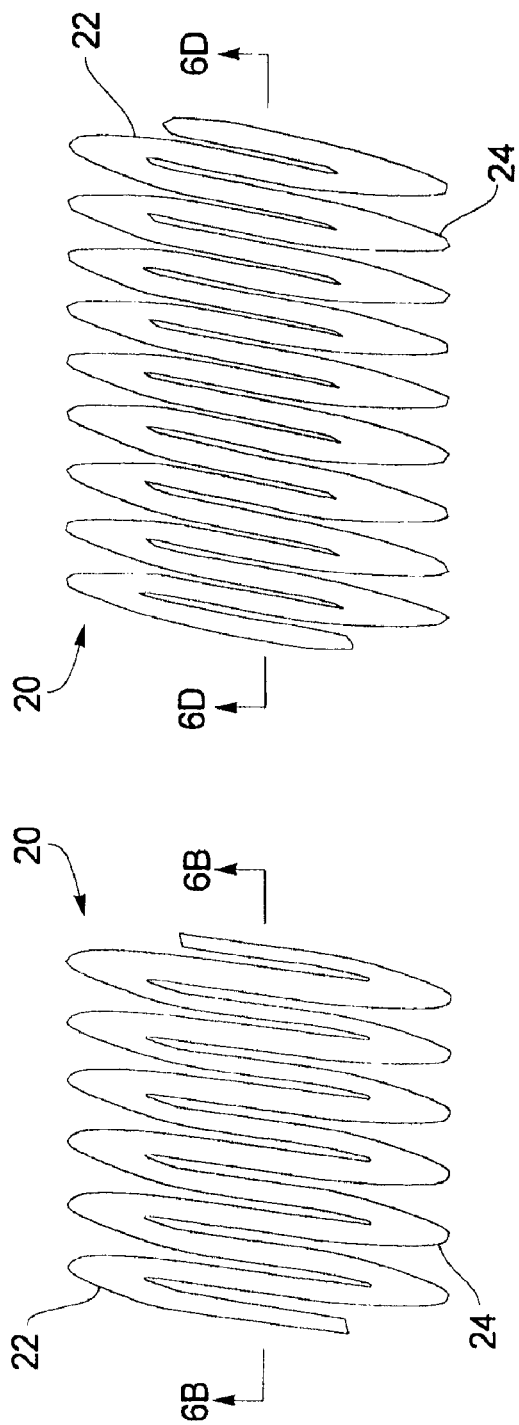
FIG. 6A  FIG. 6B  FIG. 6C  FIG. 6D

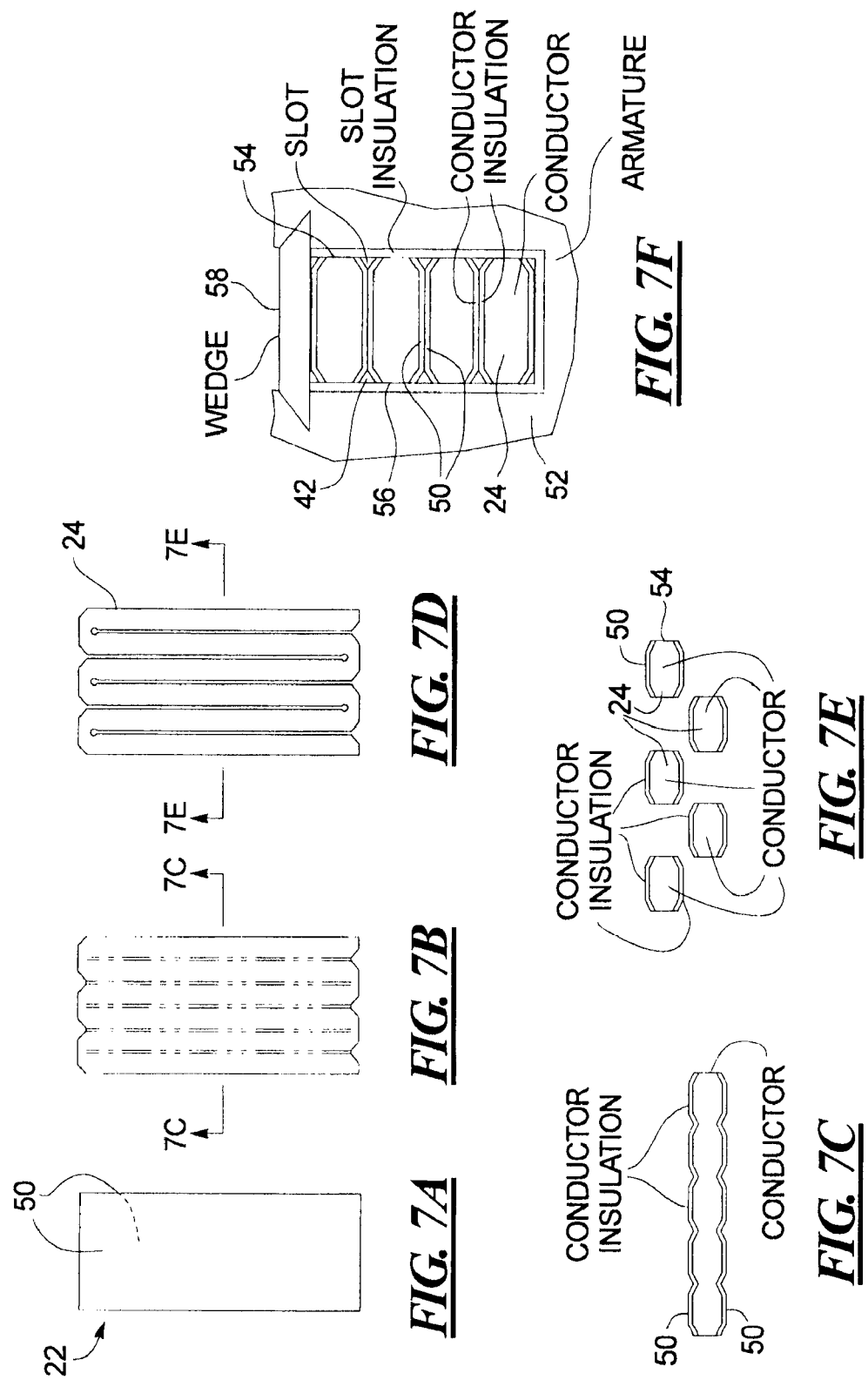

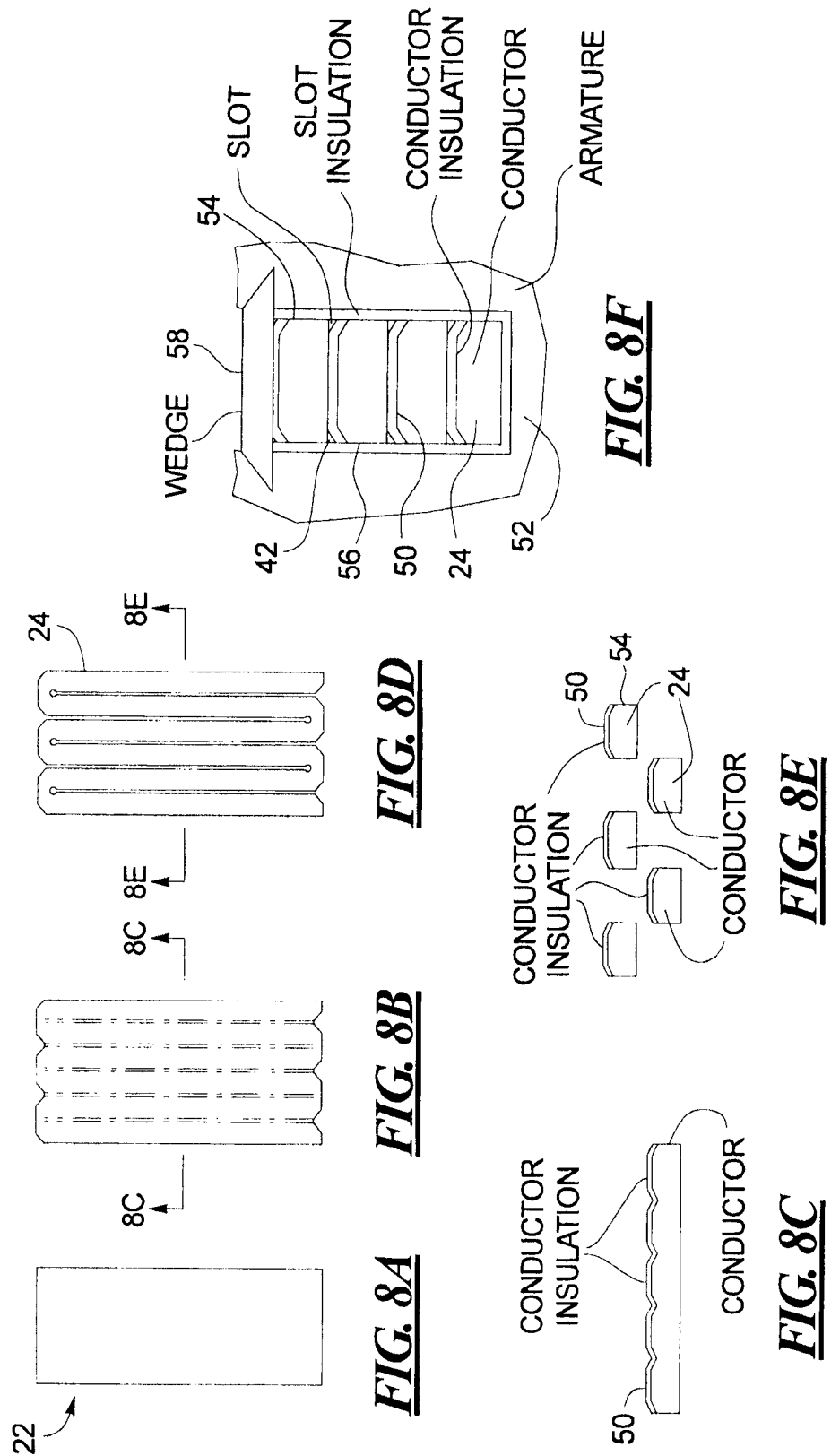

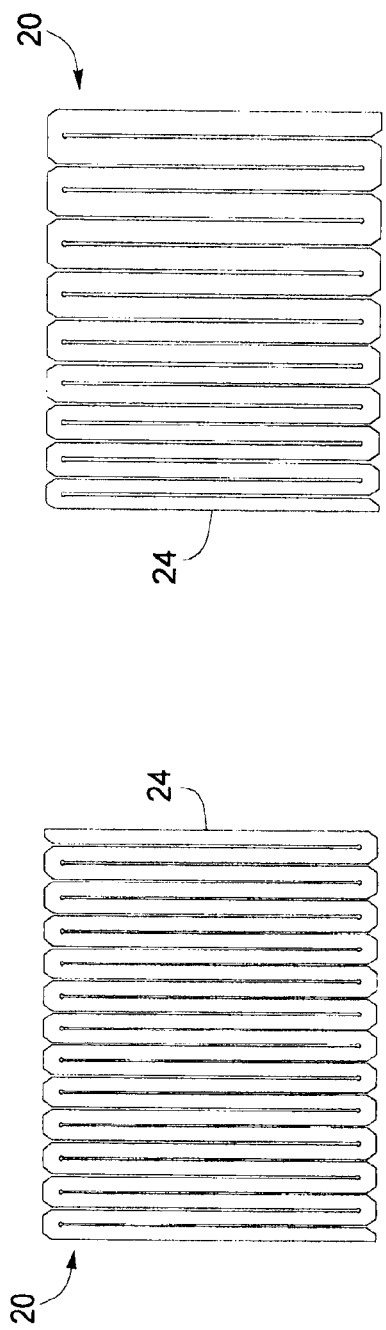
FIG. 10A
FIG. 10D
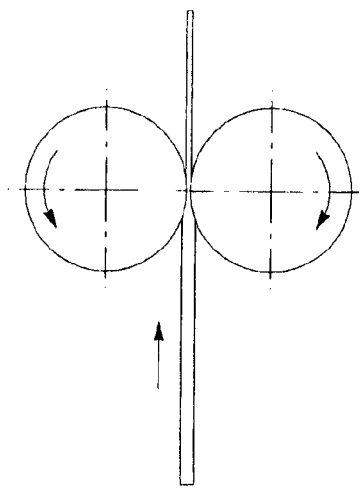
FIG. 10C
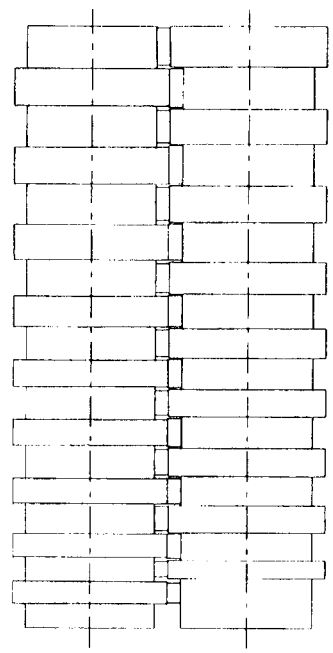
FIG. 10B

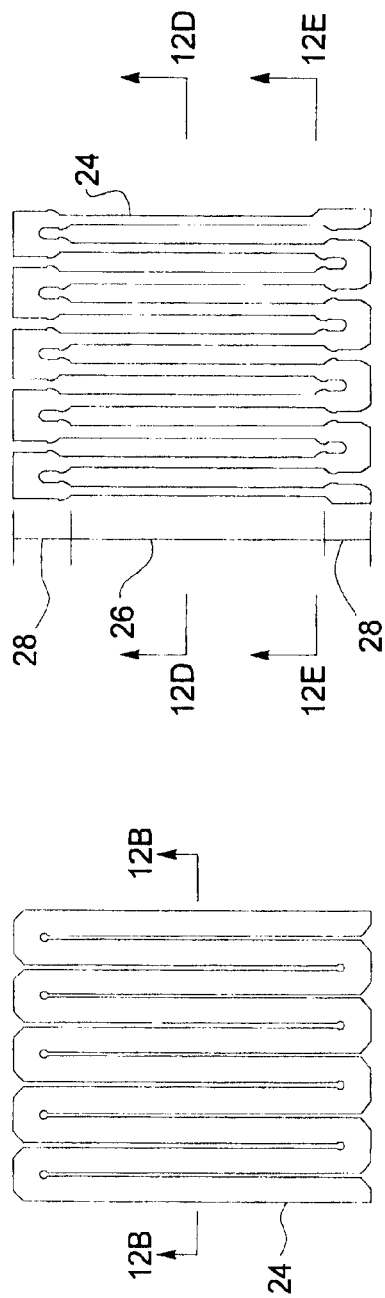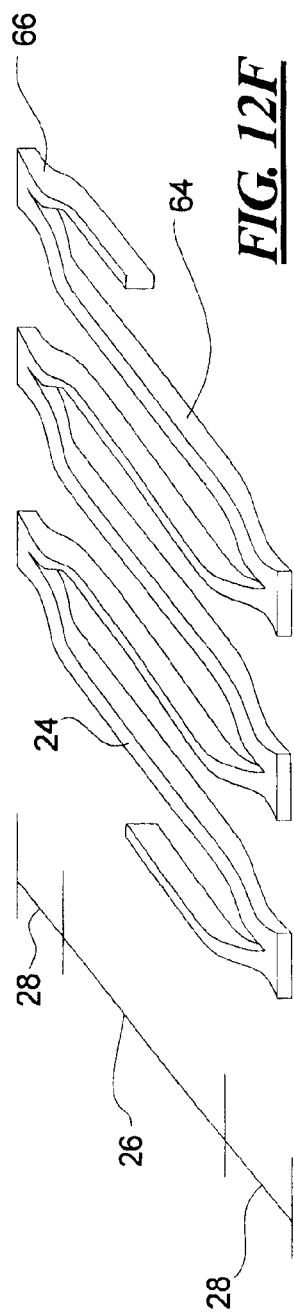

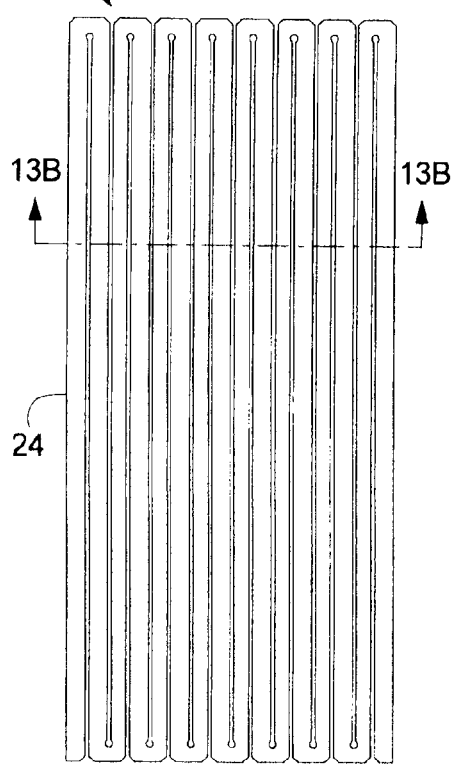
*FIG. 13A*
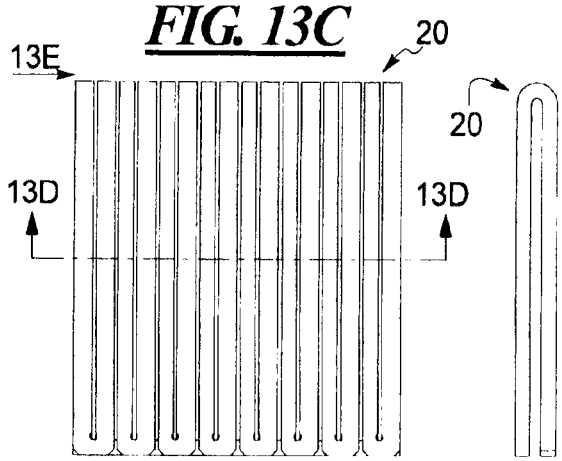
*FIG. 13C*
*FIG. 13E*
*FIG. 13D*
*FIG. 13B*
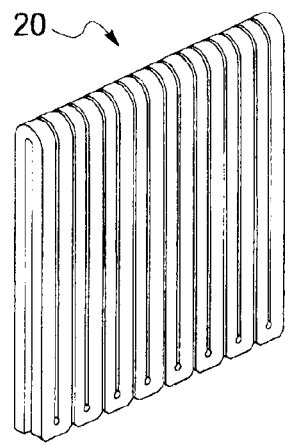
*FIG. 13F*

*FIG. 14A*
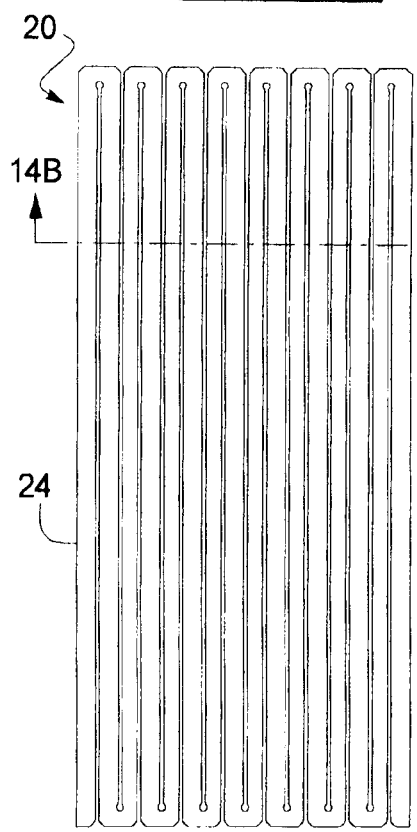
*FIG. 14C*
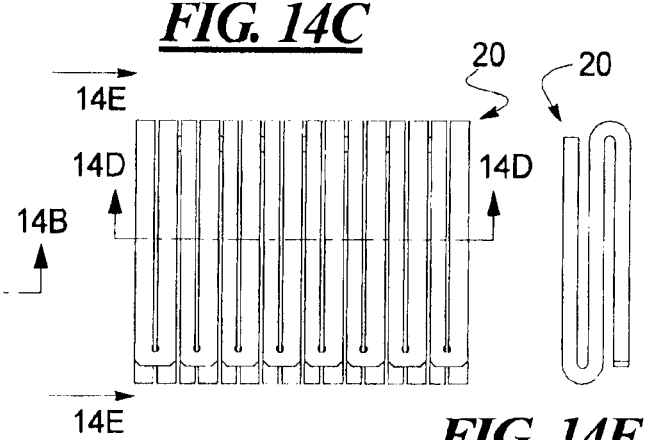
*FIG. 14E*
*FIG. 14D*
*FIG. 14B*
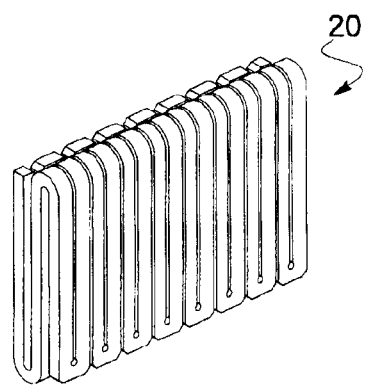
*FIG. 14F*

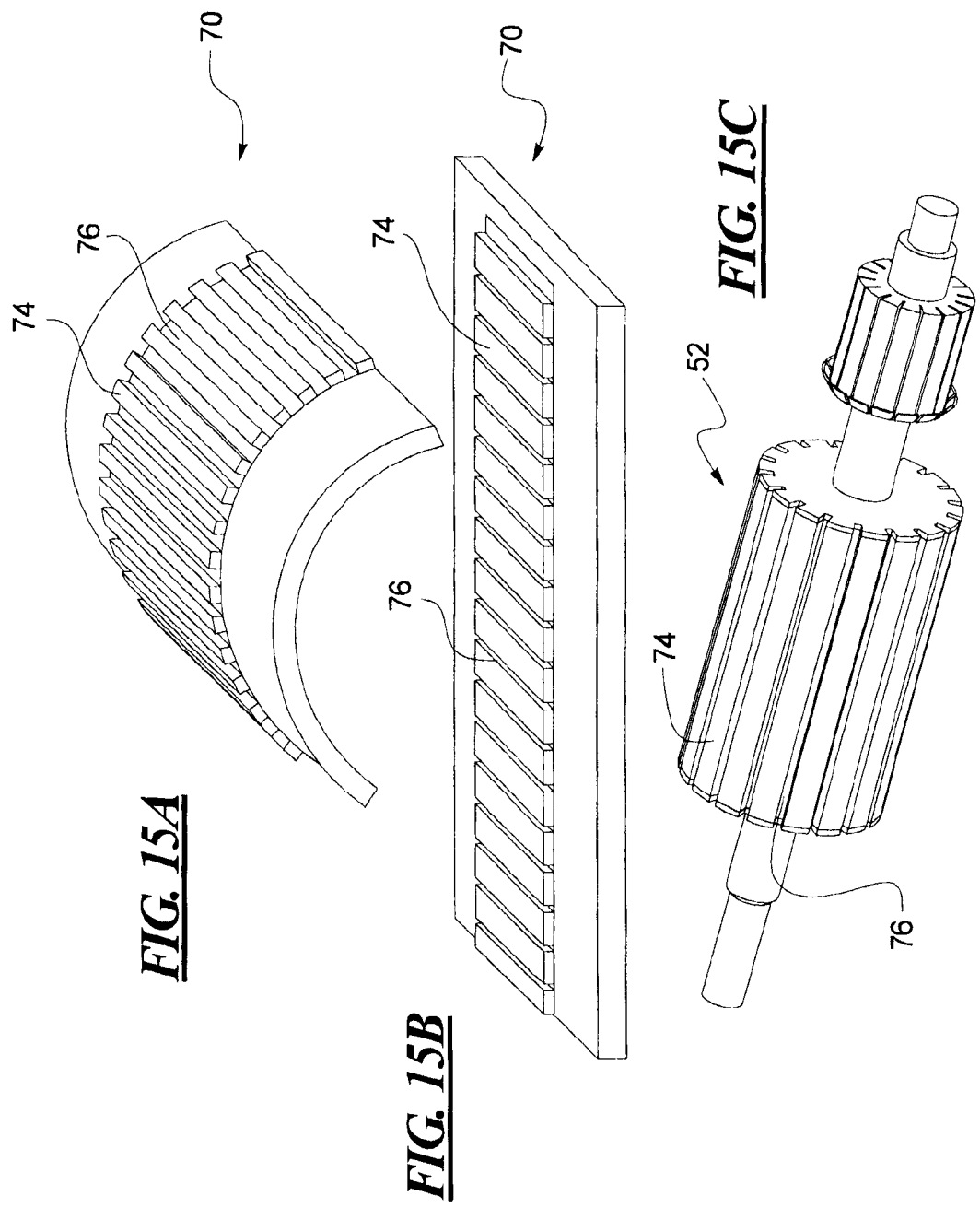

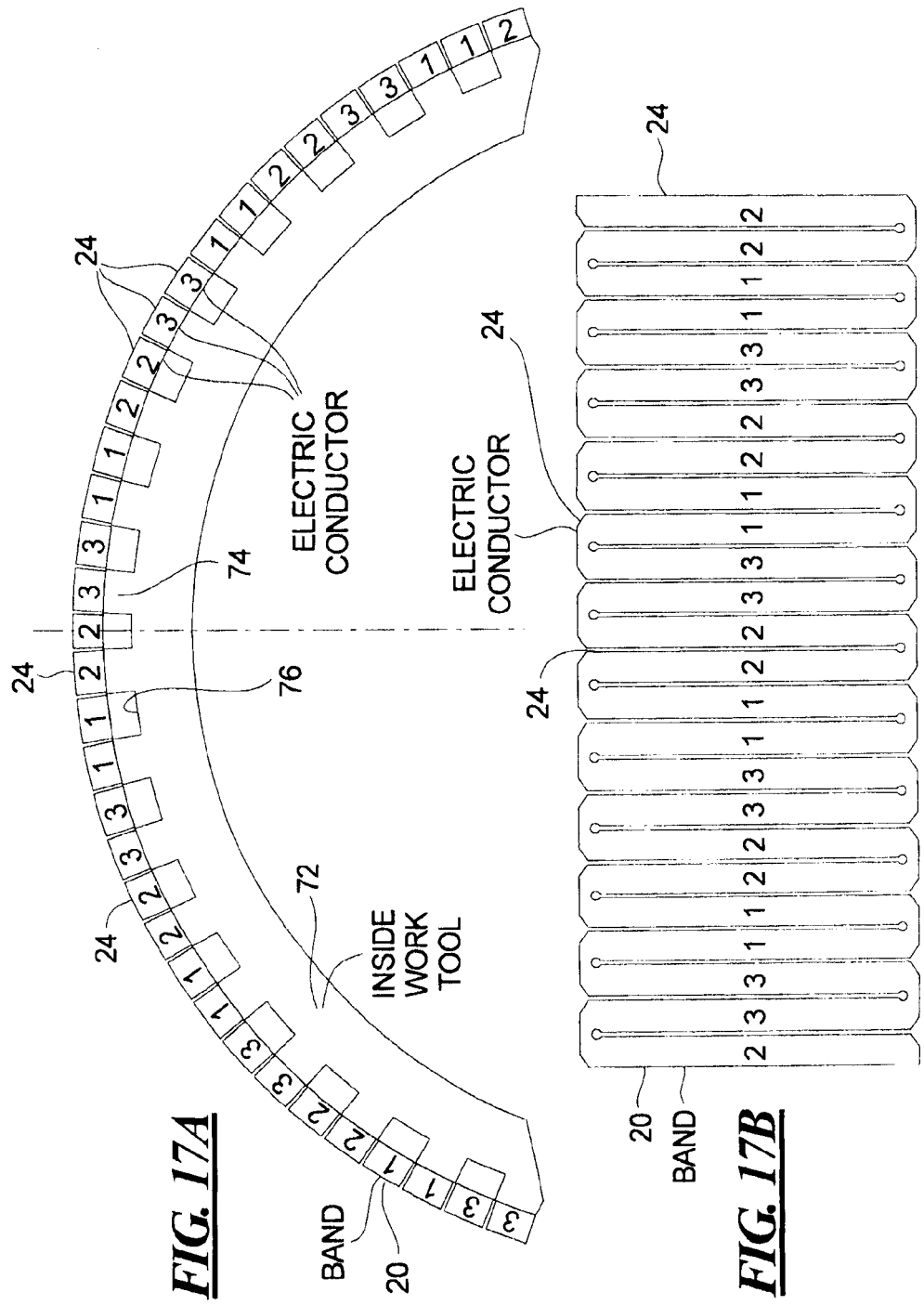

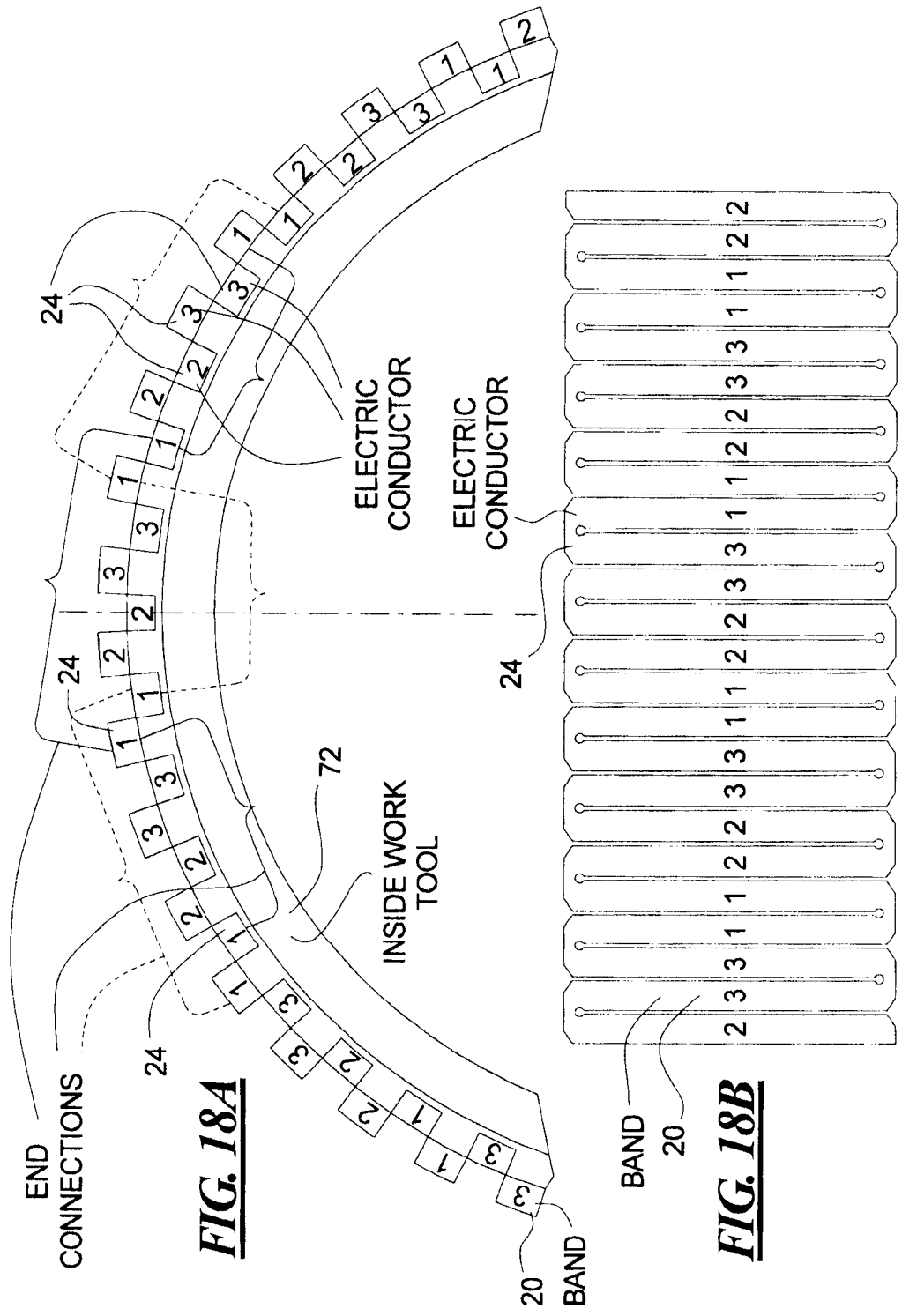

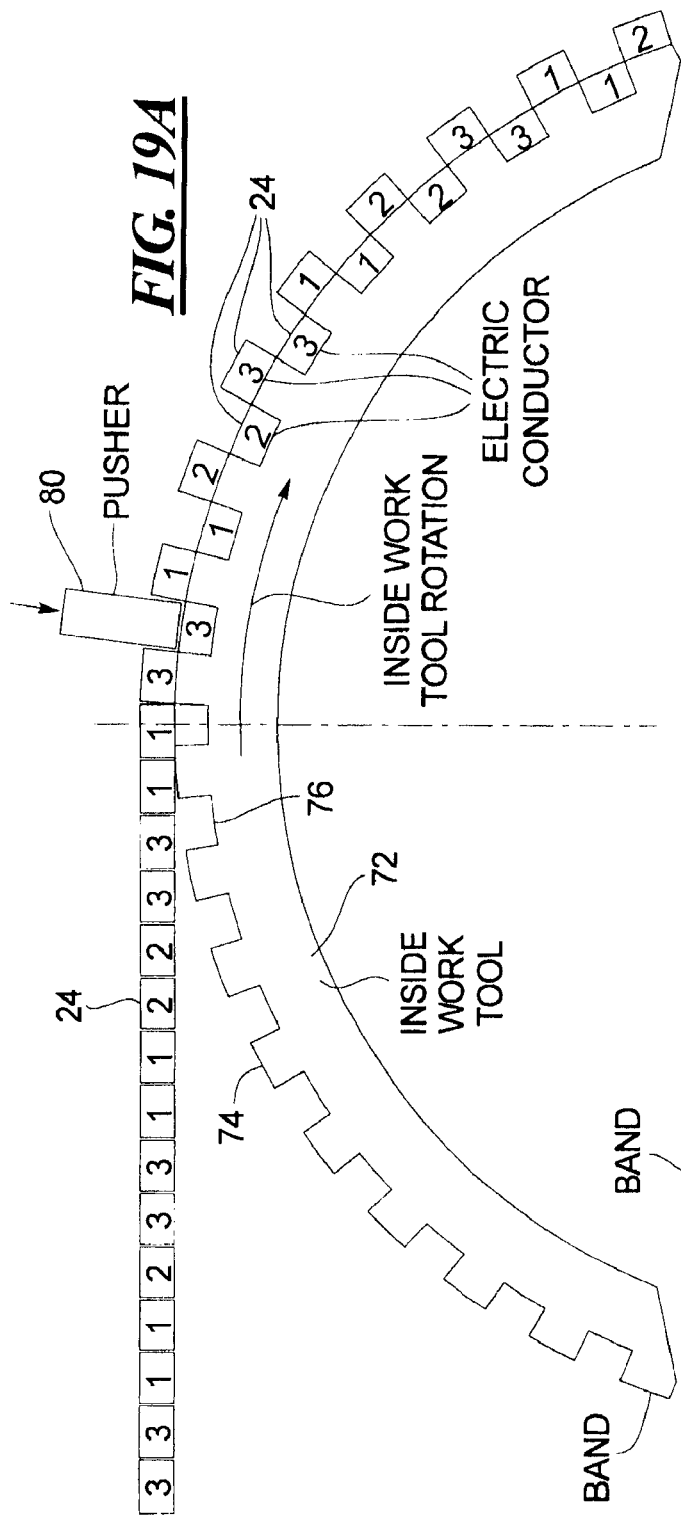
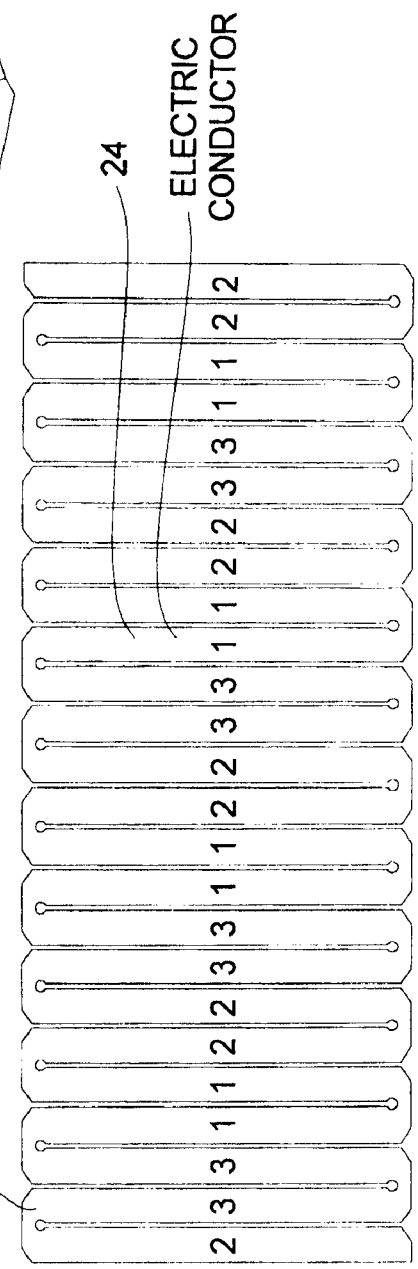

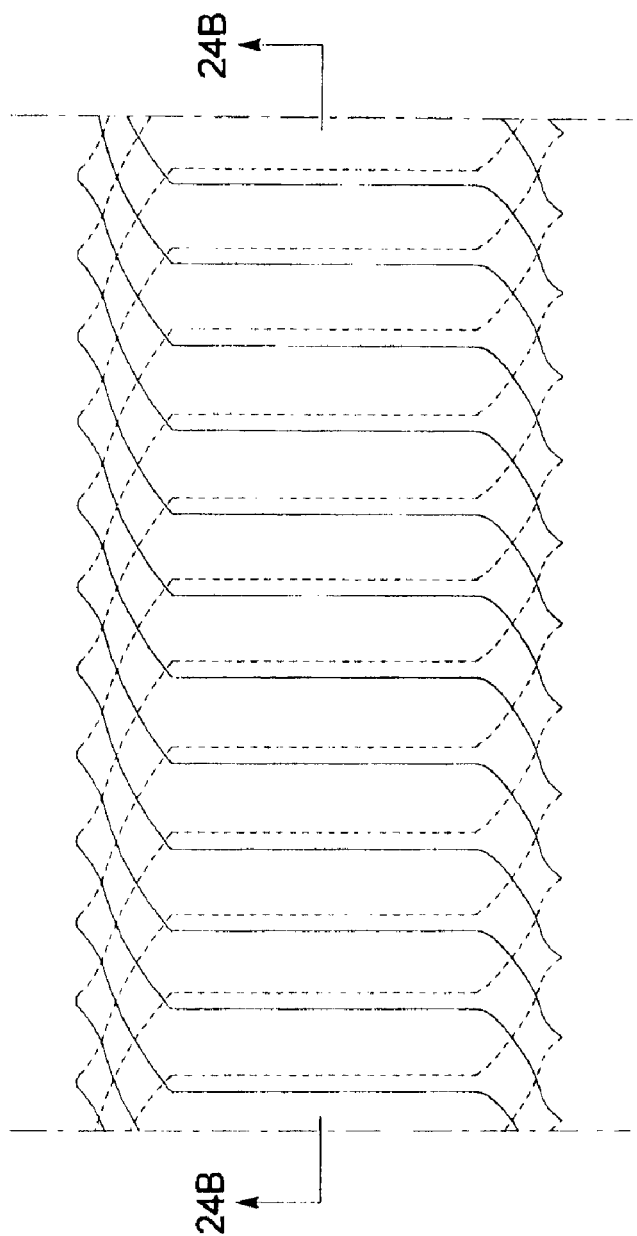
FIG. 24A
FIG. 24B

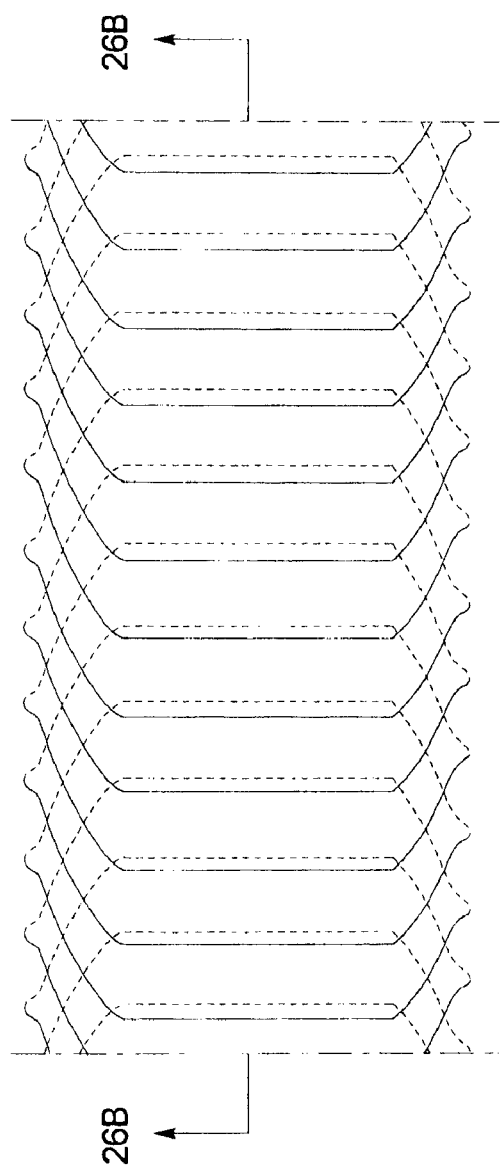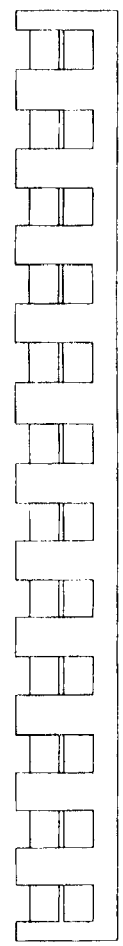
FIG. 26A
FIG. 26B

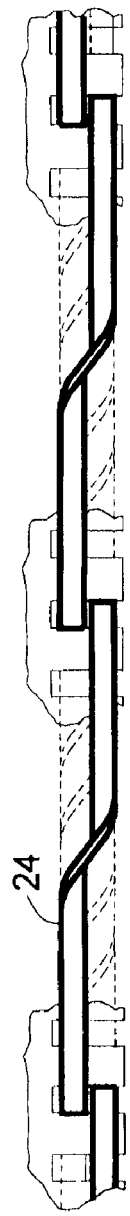
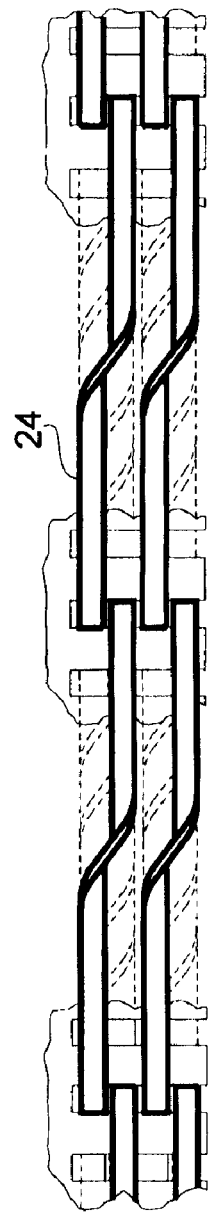
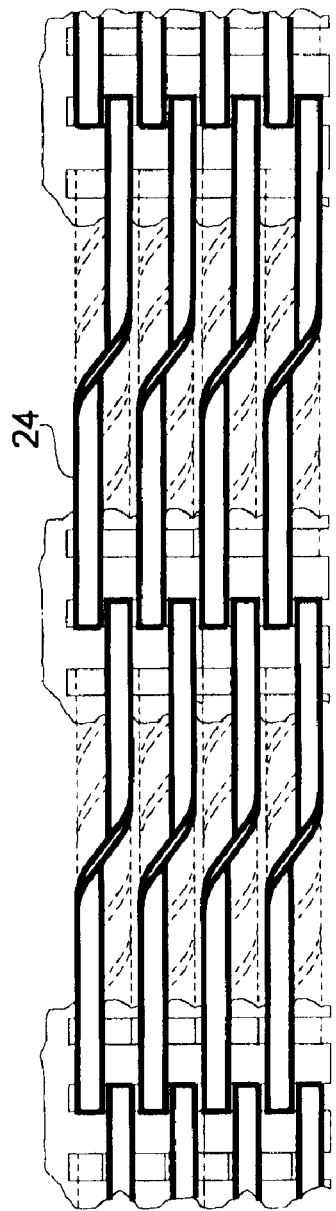
FIG. 30A
FIG. 30B
FIG. 30C

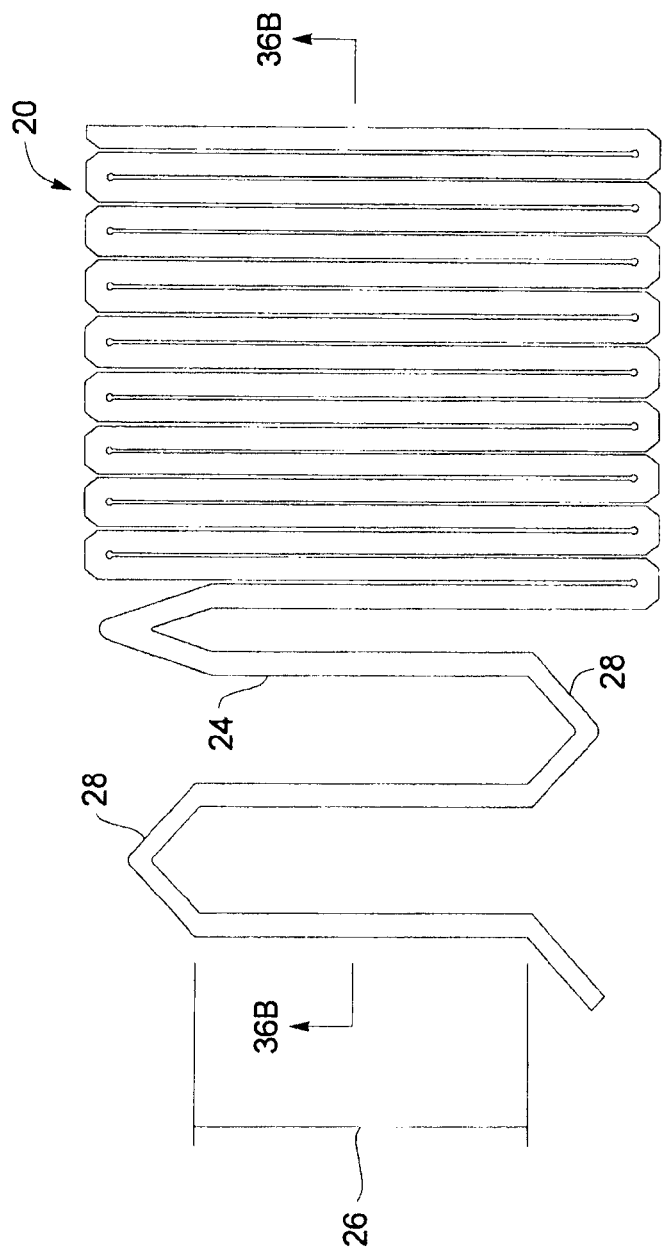
*FIG. 36A*
*FIG. 36B*

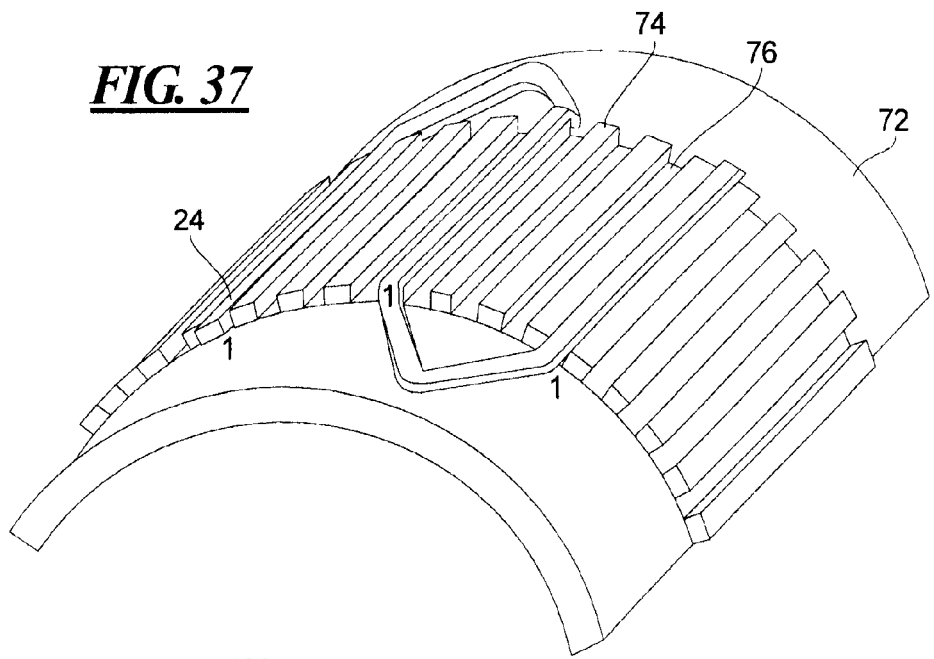
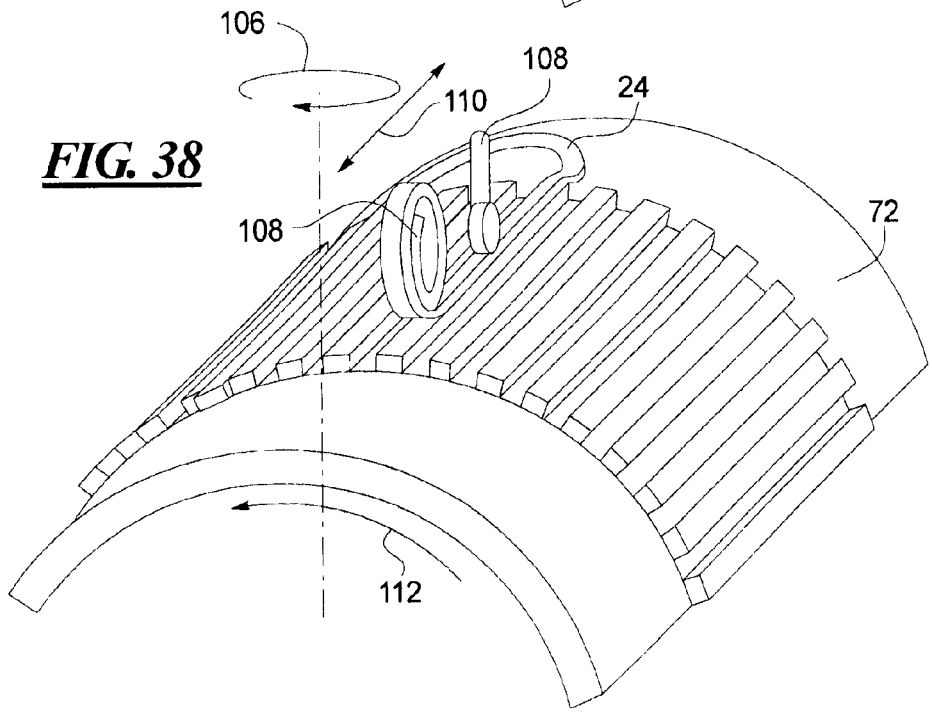

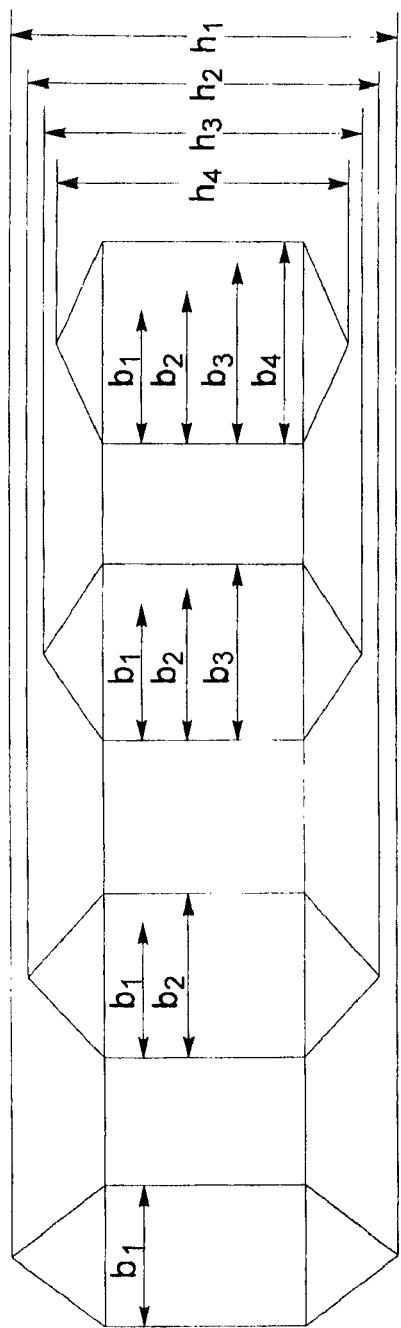
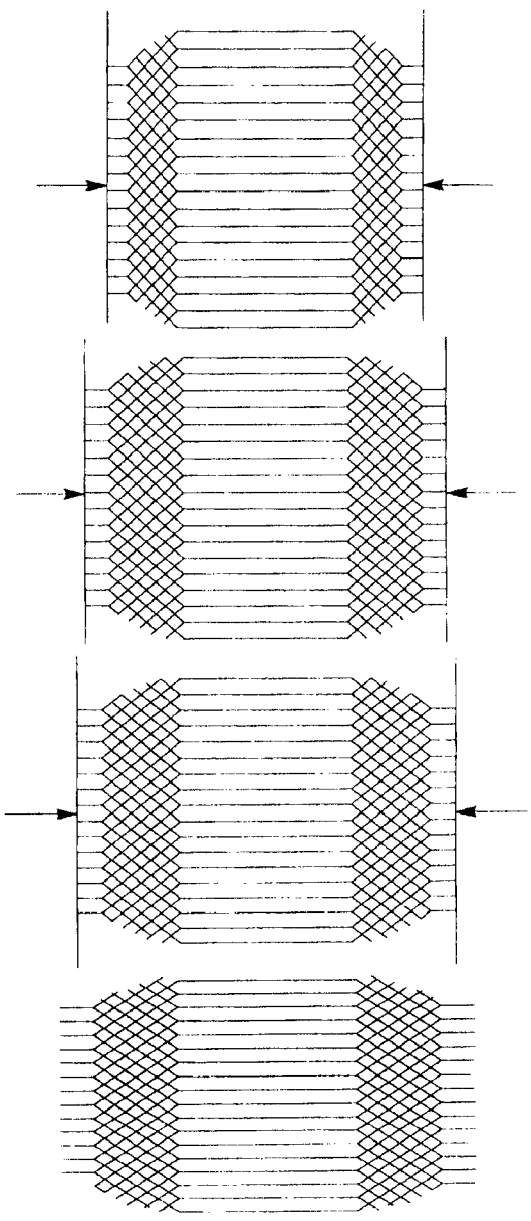
FIG. 39A
FIG. 39B

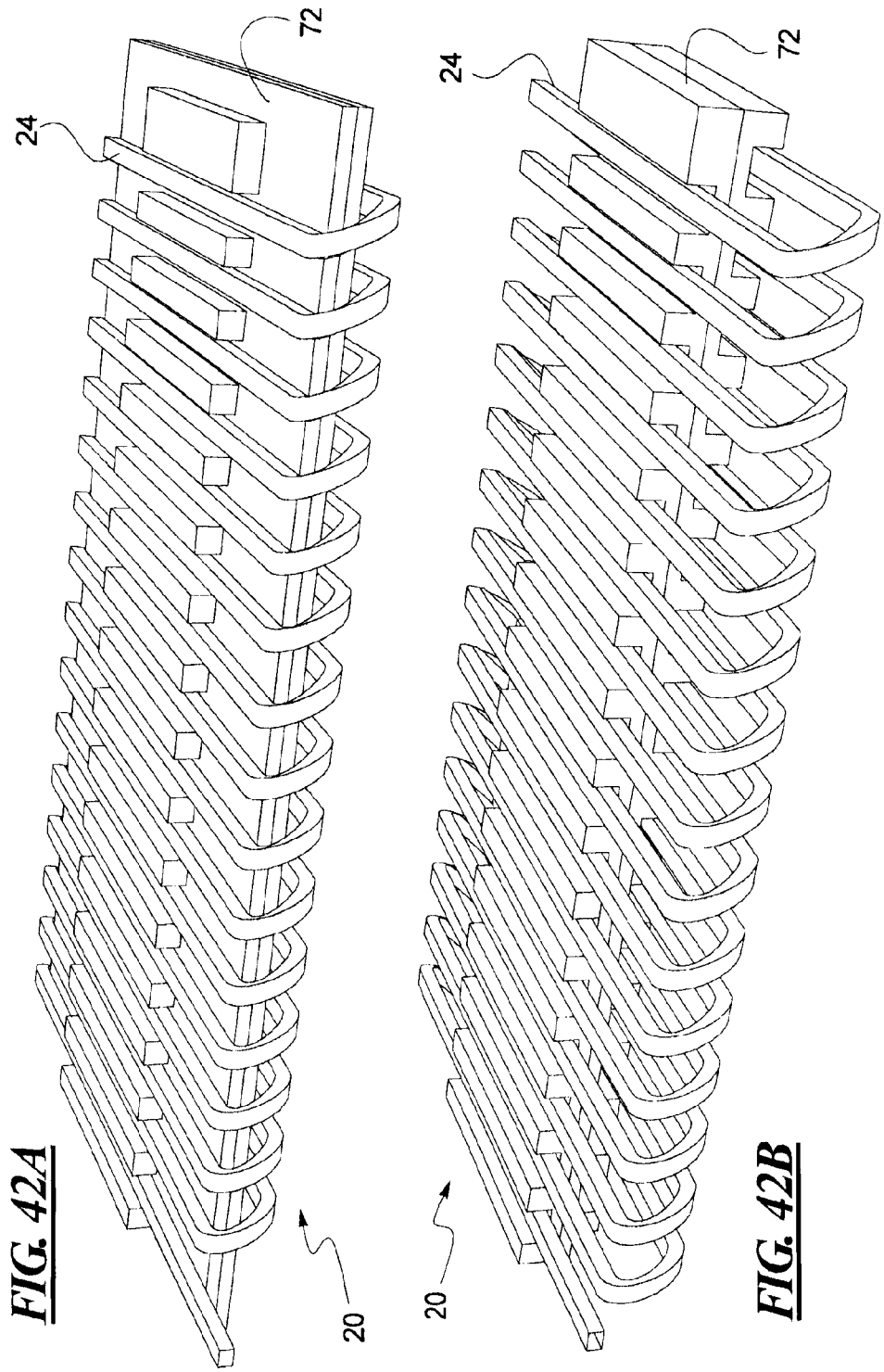

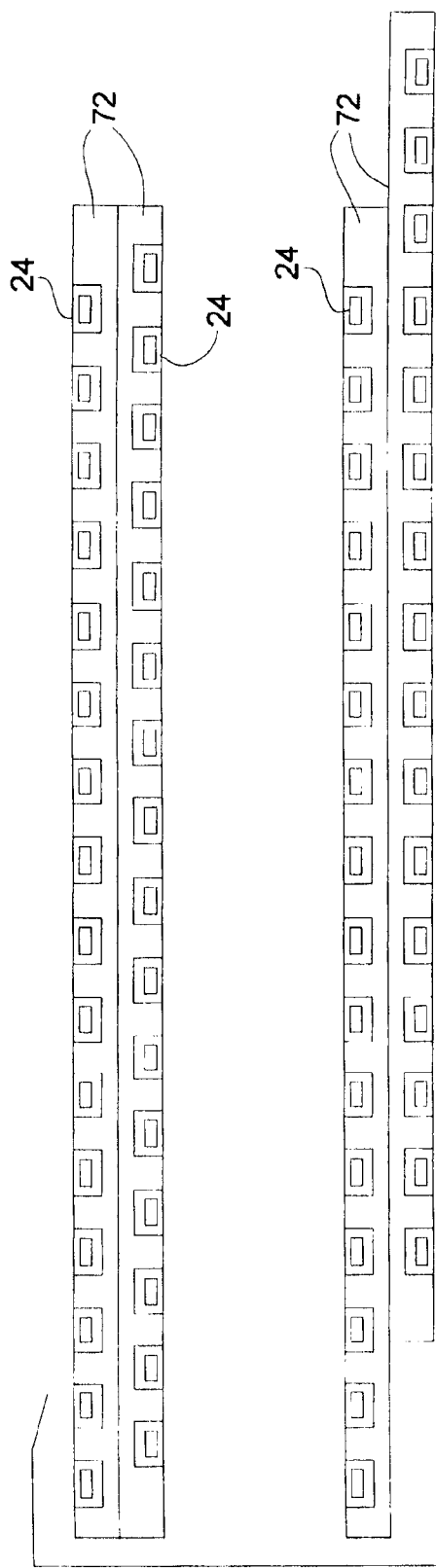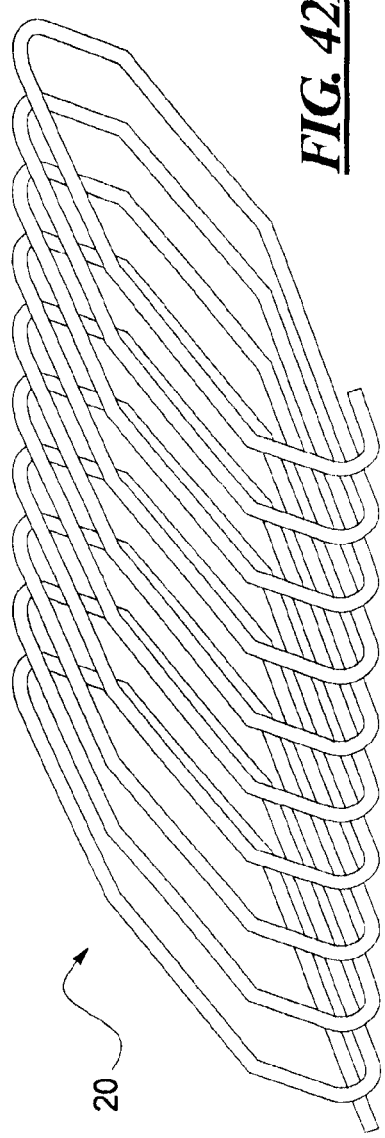
FIG. 42C
FIG. 42D

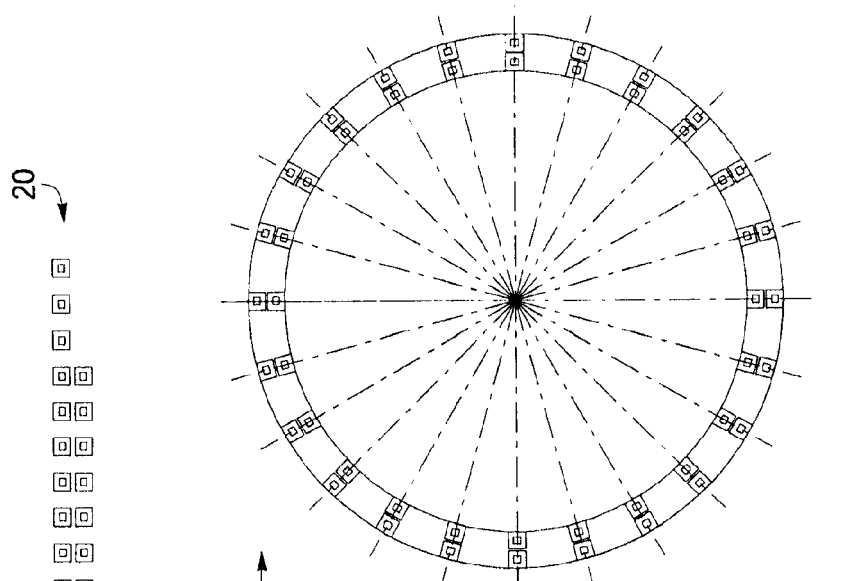
*FIG. 43A*
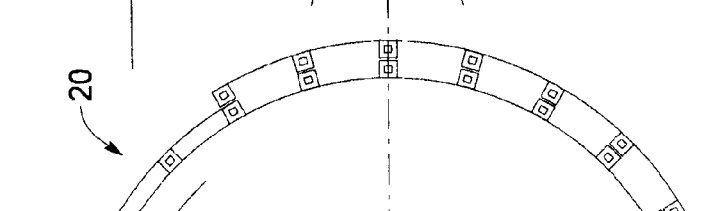
*FIG. 43B*
*FIG. 43C*

METHOD OF MANUFACTURING OF AN ARMATURE WINDING FOR ELECTRO-MECHANICAL MACHINES

This application claims priority under 35 U.S.C. §119(e) to U.S. Provisional Application Ser. No. 60/669,735, filed Apr. 8, 2005, which is expressly incorporated by reference herein.

BACKGROUND

This disclosure relates to anchor windings for various electro-mechanical machines of small and medium size, for example automobile generators, electrical DC and AC motors both round, arc and linear for driving various equipment, etc. in which windings are placed in slots of an iron core. There are numerous disadvantages of prior designs, namely, the majority of windings for small and medium size electrical machines are manufactured using round wire which is not capable of providing highly uniform winding, causes high electrical losses, low copper fill in slots and requires complex and labor consuming operations while being manufactured.

Other prior designs describe various designs for stators of electrical machines, mostly automotive generators, formed of rectangular or square cross sectional wire. Such wire can be laced into the stator core winding slots in a very densely packed configuration. This allows larger cross sectional areas to be provided for the conductors, thus lowering the winding's resistance. Reducing the stator core winding resistance improves efficiency. Such rectangular wire core designs are said to improve "slot space utilization".

Further other designs describe a stator winding which includes a plurality of U-shaped segment conductors and forms two coil ends which project from two end surfaces of the stator iron core in axial directions respectively, the segment conductors including U-shaped turn portions respectively. The U-shaped turn portions are located in one of the two coil ends, and ends of the segment conductors are located in the other of the two coil ends; wherein the ends of the segment conductors are connected at joint portions which are arranged in a multiple-ring shape.

Still further prior designs describe rectangular conductors placed in stator slots, in particular each of electric conductors which are accommodated in one of slots and are adjacent to one another are bent. This invention includes not less than four conductors per slot, stacked only in a radial direction.

Another prior design describes the main difference being that the stator has two end surfaces, in an axial direction of said iron core, which are formed such that one of the two end surfaces has openings constituting second slot openings through which said electric conductors are inserted into said slots, end portions of said electric conductors being bent in circumferential directions at positions immediately outward of said second openings.

Yet other prior designs describe variants of technology having conductors with square or rectangular cross section in slots and round in the front end zones.

Still yet other designs describe multi-phase stator winding, comprised of independent sets of three-phase windings, each being wound on the armature core by being inserted in the slots so that the n sets of three-phase windings are shifted from each other by an electrical angle of $\pi/(3n)$ radians. Also, a design is described comprised of first and second sets of three-phase windings wound respectively being inserted in said plurality of slots so that the respective sets of three-phase windings are arranged with a phase difference of electrical angle of $\pi/6$ radians therebetween;

Further prior designs describe similar solutions based on utilization of U-shaped segments for multi-phase stator winding. In particular, different layers arranged in a depth direction of each slot, and conductor segments are insulated from each other. This multi-phase stator is suggested for use together with a Lundel-type rotor.

Yet other prior designs describe utilization of the given design to achieve good air cooling for the stator using in front end zones a cooling air passageway; two ventilation passages are provided at both axial ends of the field rotor.

Still yet other prior designs describe various technologies for manufacturing windings with square or rectangular conductors.

Other prior designs describe the method of welding a plurality of pairs of connection ends of a plurality of segments of a circumferentially disposed stator winding of a rotary electric machine.

Further other prior designs describe a design and method for manufacturing a winding in which two continuous electrical conductors per phase are positioned into a predetermined pitch of the winding slots, and extend from the lead side and non-lead side of the core.

A major disadvantage of the above design and method of manufacturing is the requirement to make many welding connections—two connections per slot for two-layer winding and four connections per slot for four-layer winding. These connections have to be made in a very limited space making manufacturing labor consuming and expensive.

Moreover other prior designs describe a stator having a polyphase stator winding comprising a number of winding sub-portions in each of which a long strand of wire is wound so as to alternately occupy an inner layer and an outer layer in a slot depth direction within said slots at intervals of a predetermined number of slots, the strand of wire folding back outside the slots at axial end surfaces of the stator core, wherein winding subportions are constituted by at least one winding assembly.

These designs reduce the amount of necessary welding, however at the expense of a more complicated process of stator manufacturing.

Therefore, there is a need in the art for a method for manufacturing armature windings for electro-mechanical machines that overcomes the disadvantages of the prior art, provides highly uniform winding, increased copper fill in slots, improved motor efficiency, lower material costs and labor consumption for manufacturing and provides the opportunity for automated production.

SUMMARY

The present disclosure is directed to a highly uniform winding with high copper fill, free from numerous welding connections. The many embodiments allow manufacturing of different types of windings, including wave winding, lap winding and mixed winding with number of layers "n" (where "n" is any number starting from 1 and number of conductors "m" (where "m" is any number starting from 1). The embodiments described herein can also be used to manufacture armature winding for DC and AC electrical machines, also for other types of special machines for example linear and arc stators for motors, magneto-hydrodynamic pumps, etc.

A useful effect is achieved due to the winding being made from a preliminarily manufactured one layer or a multi-layer band comprised of connected conductor elements. This band can be made in several ways, including, without limitation, cutting, stamping or otherwise forming from a sheet or a pipe constructed from electro-conductive material, for example copper, aluminum or any other suitable material, by placing a long conductor of any cross sectional shape or winding the conductor on a mandrel, having a flat, round or other suitable cross-sectional shape.

Winding conductors configured with square or rectangular cross-sectional shape instead of conventional round typically increases the slot fill by 20-25%. Other cross-sectional shapes may also be used as required. Further, conductors configured with a changeable cross-section along its length with respect to a position in the slot height can provide an additional 10-15% depending on the specific geometry of the slot zone of the electro-mechanical machine armature.

The band of winding conductor elements may be placed in a special mandrel for winding manufacturing. During this process, conductors are separated into "n" groups (two groups minimum) depending on the required number of layers and the type of connection.

When conductors are separated into at least two groups (for example all even conductors are defined in a first group while odd conductors are defined in a second group), central zones of conductors of the first group are inserted in slots of one section of the mandrel while central zones of conductors of the second group are inserted in another section of the mandrel. Slots hold central zones of conductors in a fixed position to prevent deformation in the following stages of winding formation.

Winding formation may be made in one embodiment by shifting one section of the conductor elements (usually the central zones) associated with the mandrel relative to the other section of conductor elements (usually the central zones) associated with the mandrel such that the end zones of the conductors are deformed and that central zones of the conductor elements from different groups take a pre-determined alignment relative to one another. The winding formed in this embodiment may then be removed from the mandrel and inserted in the armature of the electro-mechanical machine.

The above method is but one embodiment in the present disclosure and several modifications thereto are also disclosed herein. For example, in one embodiment, the band may be made from a non-insulated electro-conductive material and have an insulation material applied after the winding is formed. Moreover, it is possible to utilize an actual armature for an electro-mechanical machine as one section of the mandrel so that finalizing the formation of the winding may be accomplished by inserting the conductor elements into the slots of the armature.

In another embodiment, the band comprised of connected conductor elements may be stretched according to the requirement for a specific electro-mechanical machine prior to placement in slots, thereby confirming that the central zones of conductor elements move without deformation and perpendicular to the conductor elements length while the end zones of the conductor elements are deformed as desired.

Multi-layer windings may also be manufactured in one embodiment as a combination of two or more two-layer windings.

BRIEF DESCRIPTION OF THE DRAWINGS

Certain embodiments are shown in the drawings. However, it is understood that the present disclosure is not limited to the arrangements and instrumentality shown in the attached drawings, wherein:

FIGS. 1A-D show a sheet of electro-conductive material formed into a band of connected conductor elements by stamping the sheet.

FIGS. 4A-C show a band of connected conductor elements formed by winding electro-conductive material on a mandrel.

FIGS. 5A-C show a band of connected conductor elements formed by winding electro-conductive material on a mandrel with subsequent expansion of the band.

FIGS. 6A-D illustrate a band of connected conductor elements formed by structured placement of electro-conductive material.

FIGS. 7A-F show the steps to manufacture a winding from an electro-conductive material insulated on two sides.

FIGS. 8A-F show the steps to manufacture a winding from an electro-conductive material insulated on one side.

FIGS. 10A-D illustrate the steps to manufacture a band with conductor elements of variable geometry.

FIGS. 12A-F illustrate the steps to manufacture a winding with conductor element central zones having a greater vertical extent than the conductor element end zones.

FIGS. 13A-F show the steps to manufacture a two-layer band of connected conductor elements.

FIGS. 14A-F show the steps to manufacture a three-layer band of connected conductor elements.

FIGS. 15A-C illustrate various mandrels or anchors for winding.

FIGS. 17A and B show a band of connected conductor elements disposed on the mandrel, anchor or armature.

FIGS. 18A and B show dividing the conductors into at least two groups.

FIGS. 19A and B show disposing one of the divided groups in the slots of the mandrel, anchor or armature.

FIGS. 24A and B illustrate a two-layer wave winding.

FIGS. 26A and B illustrate a two-layer lap winding.

FIGS. 30A-C show the end zones of various multi-layer windings.

FIG. 36 shows the stretching or expanding of the band of connected conductor elements.

FIG. 37 shows steps of a process of placing the stretched or expanded band of connected conductor elements on the mandrel, anchor or armature.

FIG. 38 shows the steps of a process of placing connected conductor elements on the mandrel, anchor or armature.

FIGS. 39A and B illustrate a formed band of connected conductor elements and deformation thereof to form a winding for installation on the armature.

FIGS. 42A-D show another embodiment of the steps in manufacturing a winding from a band of connected conductor elements on a flat mandrel, anchor or armature.

FIGS. 43A-C illustrate formation of a cylindrical winding from the flat winding of FIG. 41A-E or 42A-D.

DETAILED DESCRIPTION OF PREFERRED EMBODIMENTS

Figures 2A, 2B:
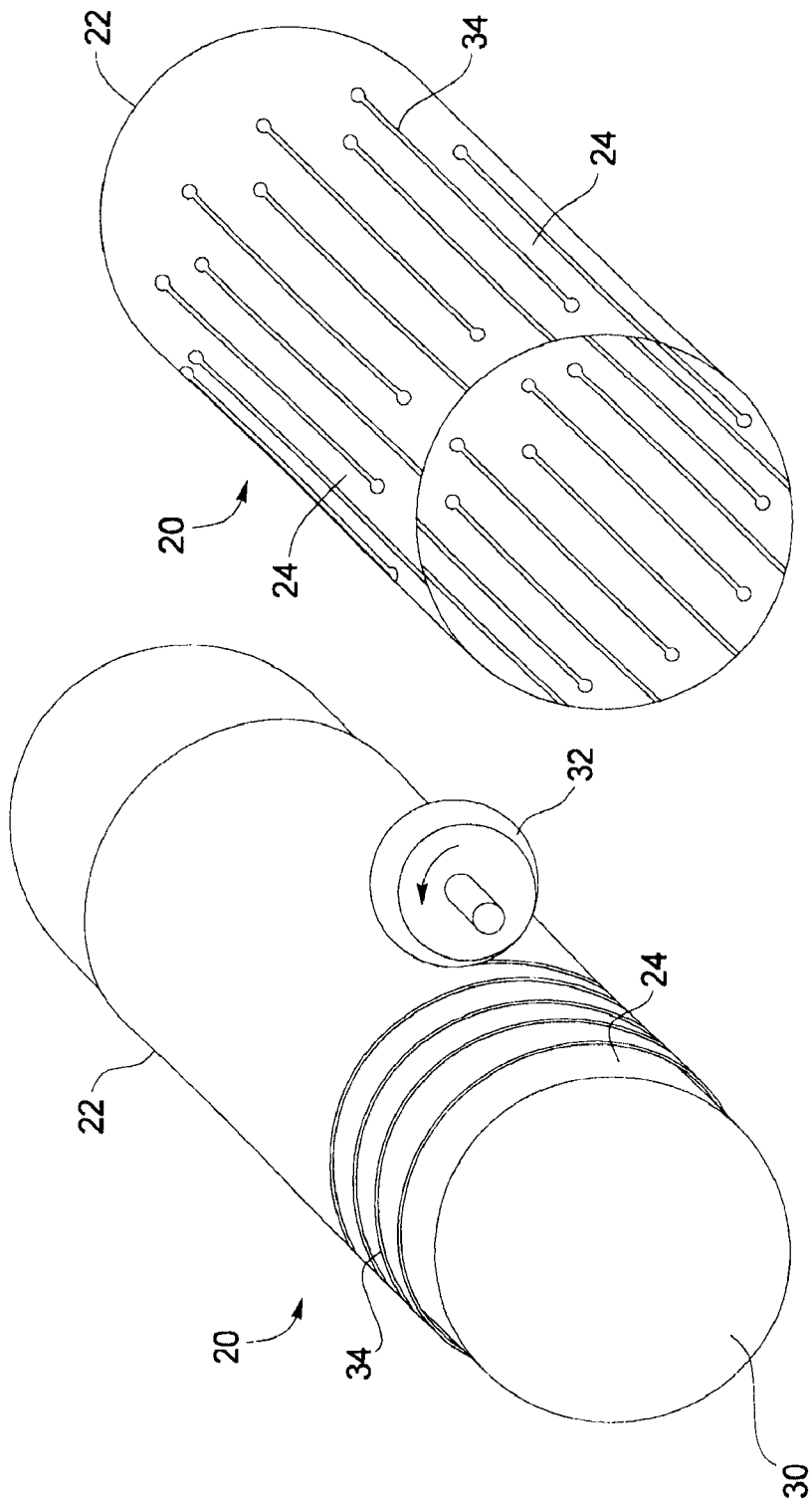
FIGS. 2A and B show a band of connected conductor elements obtained by cutting electro-conductive material originally having a pipe-like configuration.

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which the disclosure relates.

Manufacturing a band 20 comprised of connected conductor elements 24 may be done in numerous different ways, only a few of which will be described herein, which shall not be interpreted in any limiting sense, in particular:

Separating a whole piece of electro-conductive material 22, for example a sheet or a pipe using suitable methods, for example stamping with any type of stamp or cutting using any known suitable tools. For example, in one embodiment as shown in FIGS. 1A-D, a flat sheet of electro-conductive material 22 having a flat cross-section (see FIG. 1C) may be formed using any suitable method, including without limitation, stamping, forming or any other suitable forming method, into a band 20 including a plurality of conductor elements 24. Each conductor element includes a central zone 26 and end zones 28 disposed at opposing ends of each central zone 26.

For example, in another embodiment as shown in FIGS. 2A and B, a generally tubular shape of electro-conductive material 22 may be formed using any suitable method, including without limitation, cutting, grinding, slitting, slicing or any other suitable forming method, into a band 20 including a plurality of conductor elements 24. As shown in FIG. 2A, the electro-conductive material 22 may be fitted over a mandrel 30 to support the electro-conductive material 22 while the wheel 32 cuts or forms gaps or slots 34 in the electro-conductive material 22 in order to define the conductor elements 24. Similarly, in FIG. 2B, the gaps or slots 34 are formed in the electro-conductive material 22 substantially parallel to the longitudinal axis for the electro-conductive material 22.

Figure 3A:
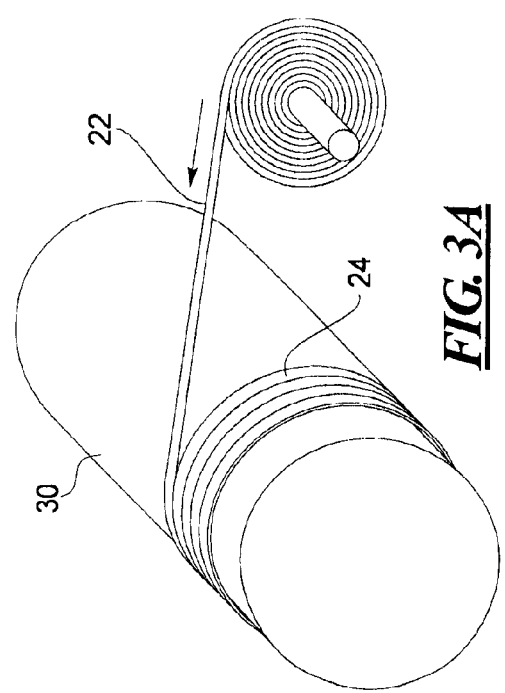
FIGS. 3A-C illustrate a band of connected conductor elements formed by winding electro-conductive material on a mandrel with subsequent deformation of the band.
Figure 3B:
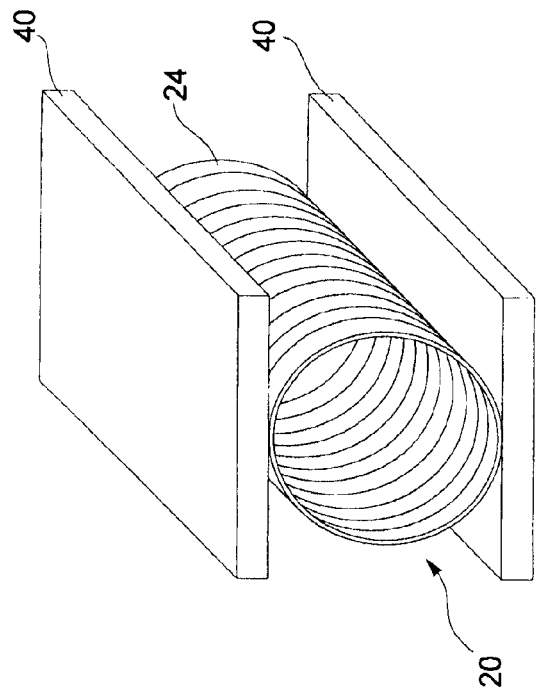
Figure 3C:
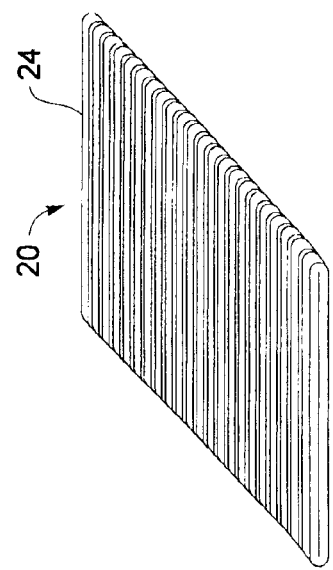

In another embodiment, electro-conductive material 22, having longitudinally extended form in this embodiment and further having any suitable cross-section, may be wound on a mandrel 30, which may have any desirable configuration, for example, flat, round or any other suitable cross-section. For example, in one embodiment as shown in FIGS. 3A-C, a supply of electro-conductive material 22 is wrapped around a mandrel 30 having a generally round cross-section. After forming the electro-conductive material 22 to the mandrel 30, the band of connected conductor elements 24 is removed from the mandrel 30 and placed between two surfaces 40, which may be useful for further forming the band 20. For example, in one embodiment, shown in FIG. 3C, the surfaces 40 compress the band 20 so as to form a multi-layer (two in this instance) band of connected conductor elements 24.

In another embodiment, for example as shown in FIGS. 4A-C, a supply of electro-conductive material 22 is applied onto and formed onto the generally rectangular shaped mandrel 30. As shown in FIG. 4B, the conductor elements 24 are created by fitting each turn of the electro-conductive material 22 side-by-side with the previous turn on electro-conductive material 22. As shown in FIG. 4C, the electro-conductive material 22 may have any suitable cross-section. For example, a horizontally prominent rectangle, a horizontally dominant oblong (rectangle with reliefs 42 formed at each corner as a bevel, facet, rounded angle or any other suitable relief) or a vertically dominant rectangle. It will be recognized by those of skill in the art that other cross-section configurations of the electro-conductive material may be used, such as tetragon, trapezium, trapezoid, parallelogram, rhombus, deltoid, square or any other suitable configuration.

In another embodiment, for example as shown in FIGS. 5A-C, a two-layer band 20 of connected conductor elements 24 may be formed by winding such electro-conductive material 22 on the mandrel 30, which may have a complex cross-section. One of skill in the art will recognize the side-by-side relationship of the electro-conductive material 22 as it is wound on the mandrel 30. As shown in FIG. 5B, the mandrel 30 is removed leaving a multi-layer band 20. As will be described in more detail below, as shown in FIG. 5C, the band 20 is expanded in a direction 44 perpendicular to a longitudinal axis 46 of the conductor elements 24 so that the central zones 26 of the conductor elements 24 are displaced parallel and the end zones 28 are deformed so that the central zones 26 of each of the conductor elements 24 are disposed in a predetermined orientation relative to one another. In each of the foregoing, a two-layer band or winding may be obtained.

In another embodiment, for example as shown FIGS. 6A-D, a band 20 is formed by structured placement of at least one continuously extending electro-conductive material 22 to form the connected conductor elements 24. It will be recognized by one of skill in the art that such structured placement may take any suitable form as necessary or desired for incorporation into the armature of an electro-mechanical machine. Such structured placement may be on a flat surface or a mandrel depending on the desired application. Additionally, it will be recognized by those of skill in the art, as likewise explained above, that the electro-conductive material 22 may have any suitable cross-section (for example as shown FIGS. 6B and D, or any other suitable configuration).

In another embodiment, as shown in FIGS. 7A-F and 8A-F conductor element isolation may be accomplished by utilizing preliminary insulated (partially (FIGS. 8A-8F) or completely (FIGS. 7A-7F)) conductor elements 24. For example, a sheet or pipe may be formed from an electro-conductive material 22 coated with sufficiently elastic insulation 50 (for example, polyamide or any other suitable material) that won't be destroyed during stamping or other forming, as shown in FIGS. 7A-E and 8A-E. In this embodiment, after initial forming of the conductor elements 24 (FIGS. 7D and E and 8D and E), a winding is formed, as will be described in detail below. When the winding is fitted to the armature 52 of the electro-mechanical machine, insulation 50 is present between conductor elements 24 due to insulation layers 50 applied to the surface of the electro-conductive material 22, while non-insulated edges 54 (as a result of forming) will be isolated from electrical contact with the armature 52 by slot insulation 56 which may be formed from any suitable material and take any suitable form to provide the advantages disclosed herein. Wedge 58 likewise may be formed from an insulated material to electrically isolate the conductor elements 24 from the armature 52. However, in the event that the conductor elements 24 are sufficiently insulated 50 and the slot insulation 56 isolates the conductor elements 24 from the armature 52, the wedge 58 in certain applications may be formed from an electrically conductive material without adverse effect. As also shown in FIGS. 7F and 8F to avoid the possibility of short circuit, longitudinal edges 42 of conductor elements have reliefs 42 formed therein, preferably with a slightly round or facet configuration or any other suitable configuration that will not damage insulation 50 during forming.

Alternatively, in another embodiment, the band may be formed as described above with a non-insulated material and the conductor elements may be insulated after forming using any conventional or suitable method, for example dipping the formed winding in lacquer before inserting it into the armature or any other suitable process.

Figure 9A:
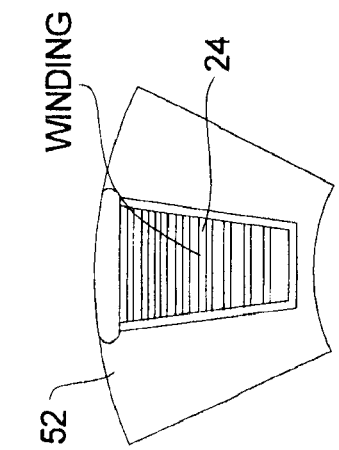
FIGS. 9A-D show prior art steps of filling an armature slot with a winding.
Figure 9B:
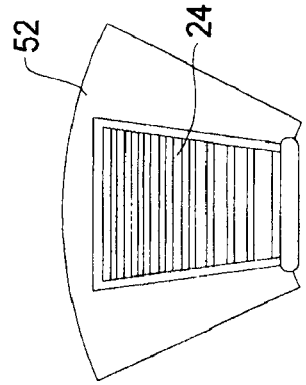
Figure 9C:
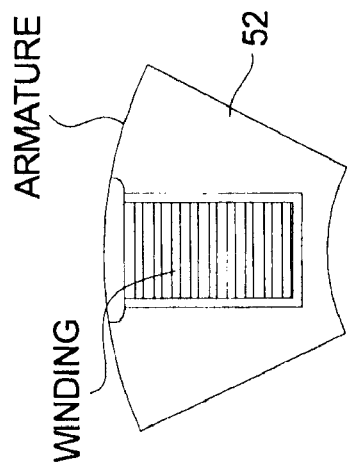
Figure 9D:
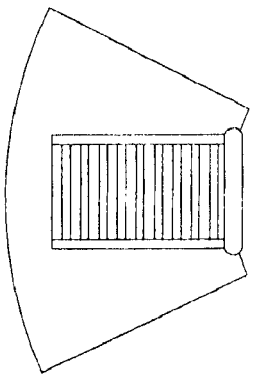
Figure 9E:
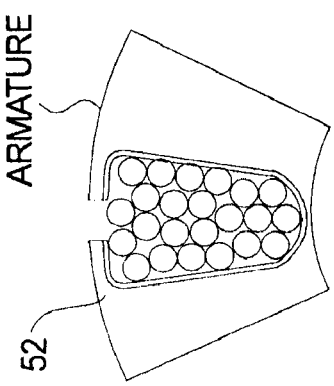
FIGS. 9E and F show conductor elements having different dimensional configurations for filling armature slots.
Figure 9F:
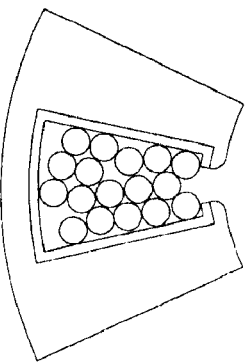

It is known that making a winding from conductors with square or rectangular cross-section shape (FIGS. 9C and D) instead of conventional round cross-section (FIGS. 9A and B) typically increases the slot fill by 20-25%. However, as disclosed herein and shown in FIGS. 9E and F, in one embodiment an additional 10-15% slot fill may be achieved depending on the specific geometry of the slot of the electro-mechanical machine armature by forming conductor elements 24 having different dimensional configurations. For example, the conductor elements 24 may vary the width, thickness, or any other parameter to achieve the desired slot fill or correspond to the slot of the armature.

The process of manufacturing conductor elements 24 of different dimensional configurations within the same winding can be accomplished using any suitable process or method such as, for example, stamping, rolling or any other suitable process. In one embodiment, as shown in FIGS. 10A-D a band 20 may be rolled (FIGS. 10B and C) to form a band 20 with conductor elements 24 having different dimensional configurations (FIGS. 10A and D). It will be recognized by those of skill in the art that the dimensional configurations that may differ are not limited to width, length or thickness. Rather, adjacent or series of conductor elements may have any different dimensional configuration as may be required by the design for the winding and the desired electrical performance parameters.

Figure 11B:
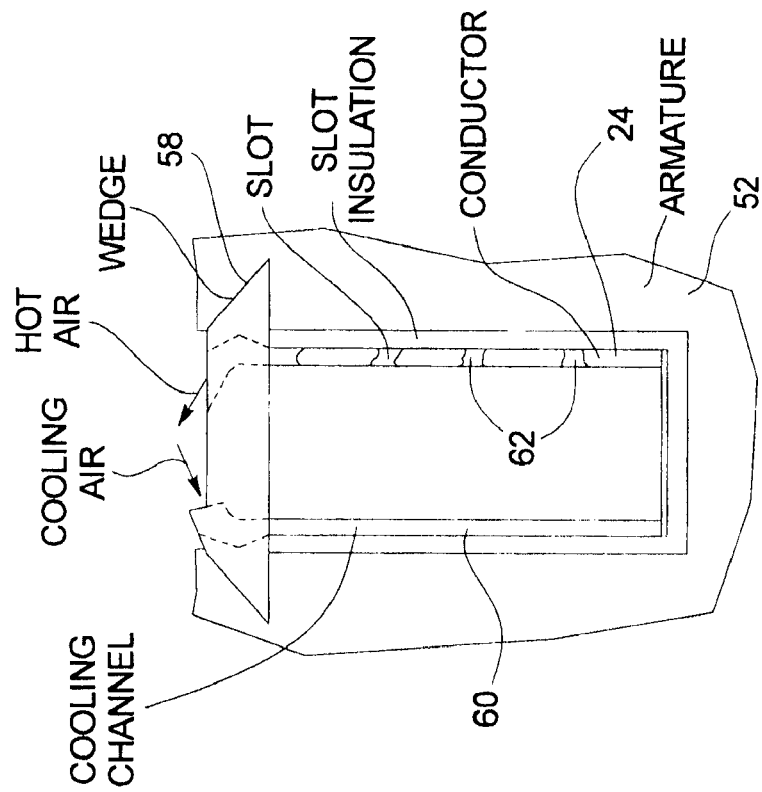
FIGS. 11A and B illustrate a band with openings formed therein.
Figure 11A:
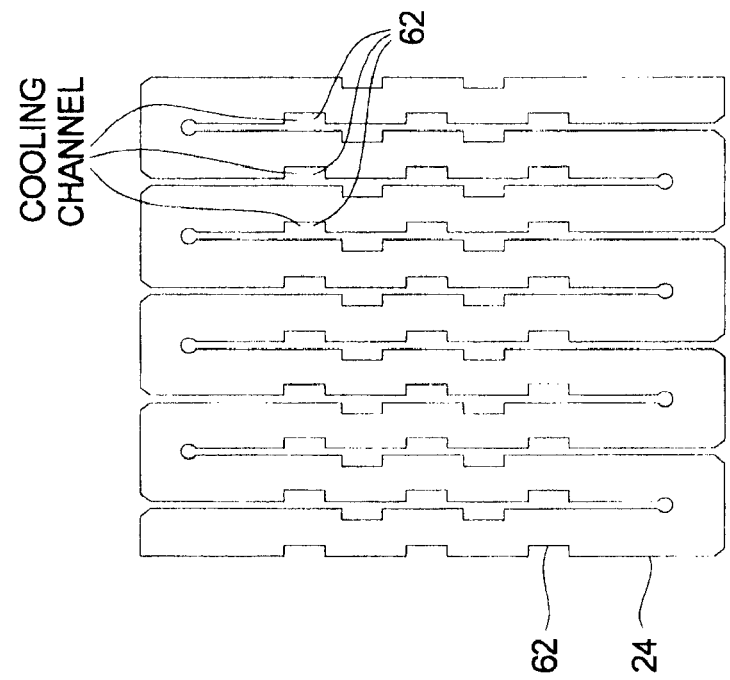

In another embodiment, as shown in FIGS. 11A and B, openings 62 may be formed in the conductor element 24 during formation of the conductor element 24 or after the winding has been formed. When inserted in the armature 52 of the electro-mechanical machine, cooling channels 60 are defined by generally vertical alignment of the openings 62 of the winding, thereby enhancing heat transfer from the winding and armature, which is especially useful in connection with rotating armatures. The wedge 58 may likewise have a channel formed therein generally aligned with the cooling channels 60 to facilitate the flow of a fluid (preferably air in this embodiment, but not limited thereto) through the cooling channels 60 (i.e., take in cool air and expel heated air). It is within the teachings of this disclosure that the openings and cooling channels may be configured in any suitable manner as necessary to provide the desired performance and advantages as disclosed herein. Accordingly, those of skill in the art will recognize the numerous embodiments taught by this disclosure.

In another embodiment, as shown in FIGS. 12A-F, it may be advantageous to use vertical conductor elements 24 with a first vertical extent 64 in the central zones 26 greater than a second vertical extent 66 in the end zones 28. However, it is not easy to form the conductor element 24 central zones 26 of this embodiment using conventional forming processes or methods. In this embodiment, the conductor elements of FIGS. 12A and B may be formed by stamping from electro-conductive sheet material and thereafter, the central zones 26 may be twisted or rotated approximately 90 degrees (or other suitable rotation amount) that corresponds to the slots of the armature to which such winding is to be fitted (FIGS. 12C, D, E and F). It will be recognized by those of skill in the art that the central zones may be modified in any manner or combination thereof as taught herein to provide the advantages of this disclosure.

In other embodiments, as shown in FIGS. 13A-F and FIGS. 14A-F, bands 20 containing more than one layer may be formed for use as multi-layer windings. The bands 20 can be obtained by bending or folding the one-layer band 20 formed as described above, as shown in FIGS. 13A-F and 14A-F. In particular, as shown in FIGS. 13A and B and FIGS. 14A and B, the band 20 is formed in any manner as described above to define a plurality of conductor elements 24. Such band 20 is then bent or folded, for example in half as shown in FIGS. 13C-F, or in thirds as shown in FIGS. 14C-F.

Once a band is formed as per any of the above embodiments or others, further processing may be useful for incorporation of such band in an armature of an electro-mechanical machine to form a winding thereof.

Figure 16:
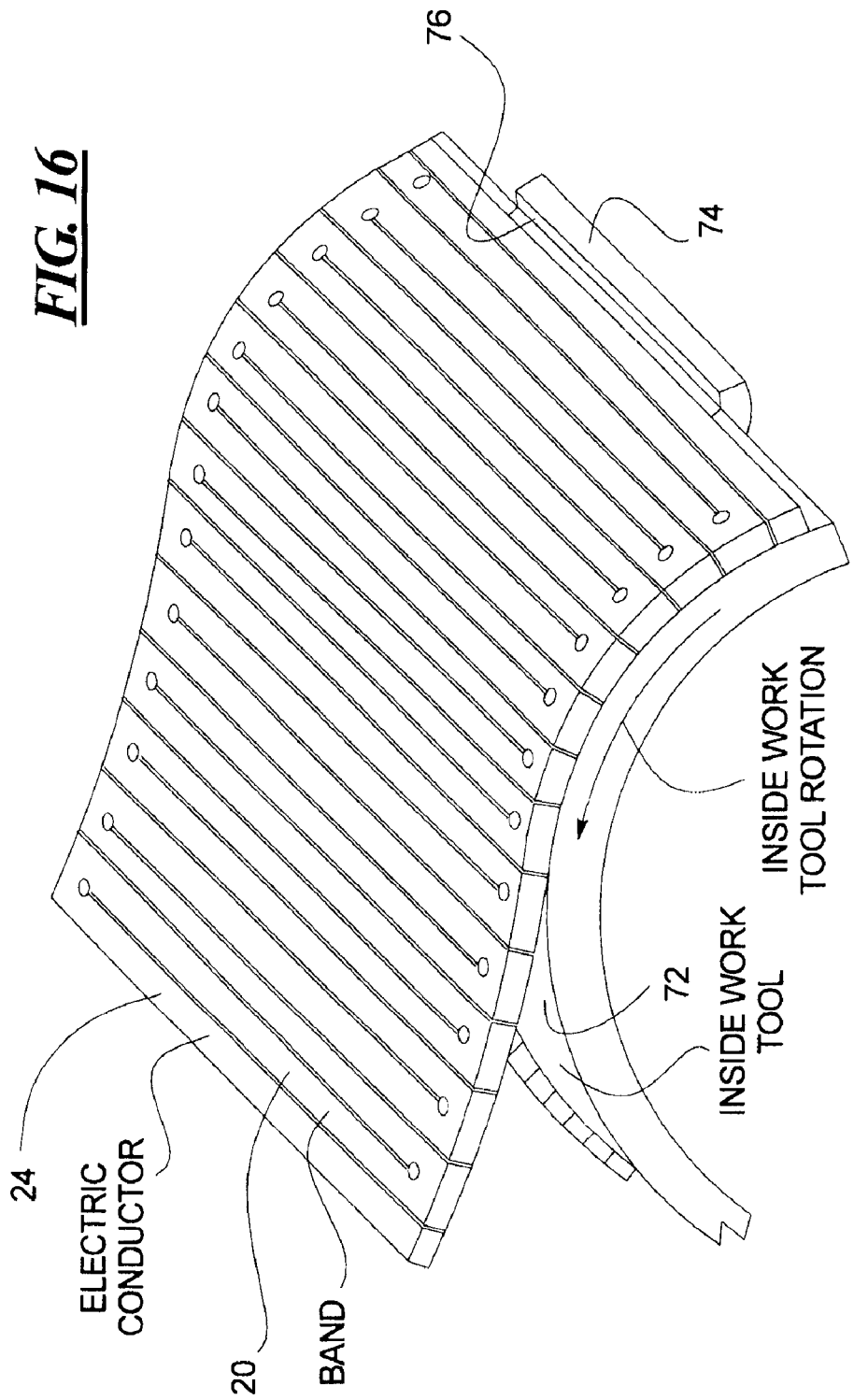
FIG. 16 illustrates the step of disposing a band of connected conductor elements on a mandrel, anchor or armature for winding.

In one embodiment, the band 20 is placed on the armature 52 or a section of mandrel tooling 70 (which may be flat (FIG. 15B) or have a contoured surface (FIG. 15A)) to form a winding. Without limitation, the armature 52 and mandrel tooling 70 will sometimes collectively be referred to herein as an anchor 72 for convenience and each will be recognized as an acceptable substitute or intermediary for the other. The anchor 72 preferably has a crenellated form defined on its outer surface, wherein the teeth or merlons 74 have a vertical extent greater than the slots or crenels 76 for formation of the winding. Generally, the slots 76 of the anchor 72 and the teeth 74 have a generally equal lateral spacing dimension or width. The band 20 is disposed on the anchor 72 such that the conductor elements 24 extending in one direction are disposed over the slots 76 and the conductor elements 24 extending in the opposite direction are disposed over the teeth 74 between slots 76, as shown in FIGS. 16 and 17A and B.

The next step, in one embodiment, as shown in FIGS. 18A and B and 19A and B, is dividing the conductor elements 24 into at least two groups, for example by pressing conductor elements 24 located immediately above the slots 76 into such aligned slots 76 (as shown in FIG. 18). In FIG. 19, one embodiment of the division step is illustrated, wherein certain conductors are pressed or formed into the slots 76 by a pusher 80 as the anchor 72 is rotated past the pusher 80 and is aligned with such slots 76. FIG. 19B illustrates with different shading how alternating conductor elements 24 are fitted into the slots while the other conductor elements remain contiguous with the teeth of the anchor 72.

Figure 20:
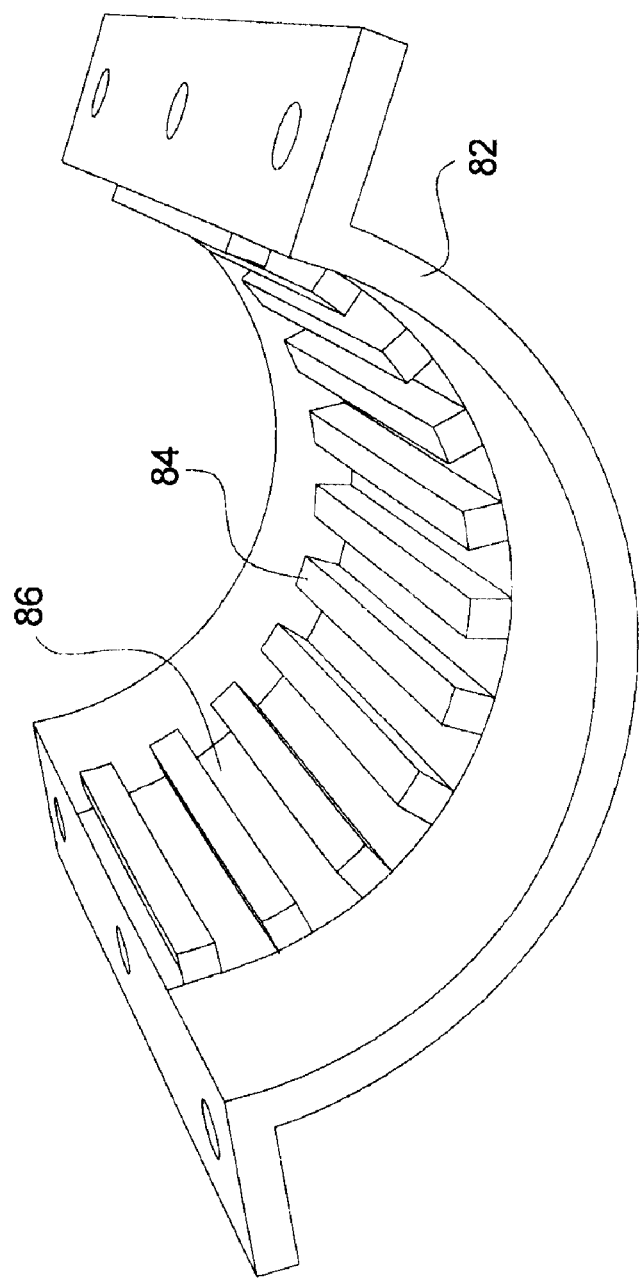
FIG. 20 illustrates one embodiment of an other section of the mandrel.
Figure 21A:
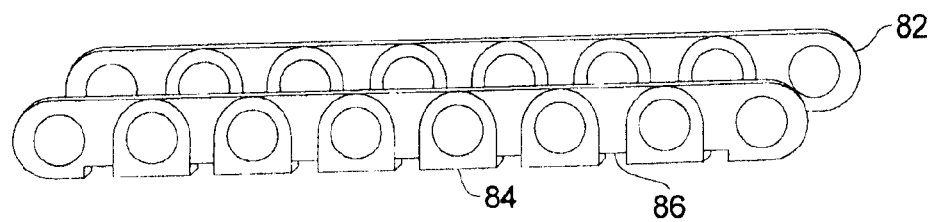
FIGS. 21A and B illustrate another embodiment of the other section of the mandrel.
Figure 21B:
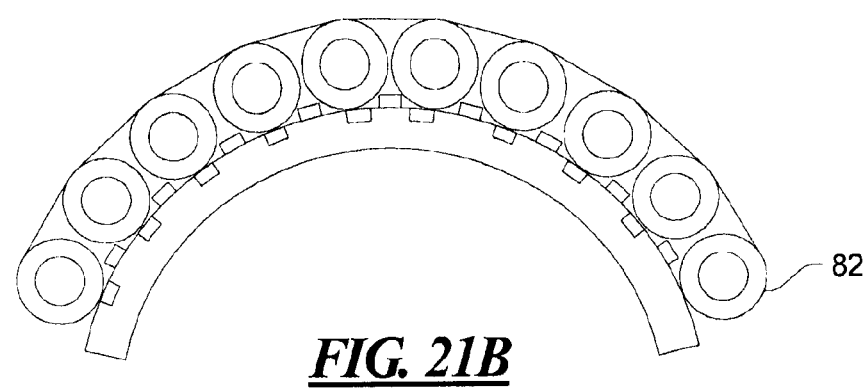
Figure 22A:
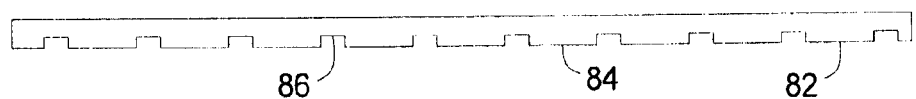
FIGS. 22A and B illustrate another embodiment of the other section of the mandrel.
Figure 22B:
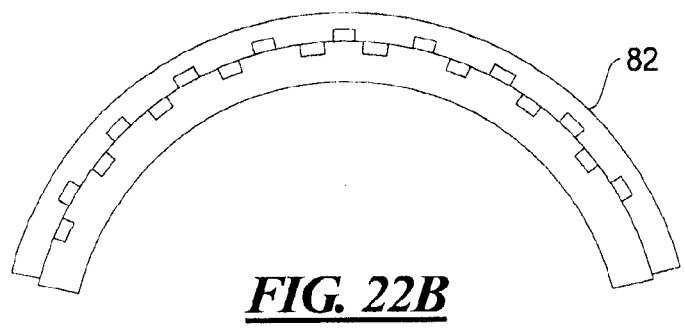

The next step, in one embodiment, as shown in FIGS. 20-22, is to cover the divided conductor elements 24 and anchor 72 with another section of the mandrel tooling 82 such that the central zones of conductor elements are fixed in slots 76, 86 and that the teeth 74, 84 are contiguous with opposed conductor elements 24 so that such conductor elements 24 remain fixed in their respective slots 76, 86. The other section of the mandrel tooling 82 may be formed of two, three or more parts, each substantially as shown in FIG. 20 as a caterpillar track (FIGS. 21A and B), an elastic but not stretchable band (FIGS. 22A and B) or any other suitable structure configured to perform the function disclosed above.

Figure 23A:
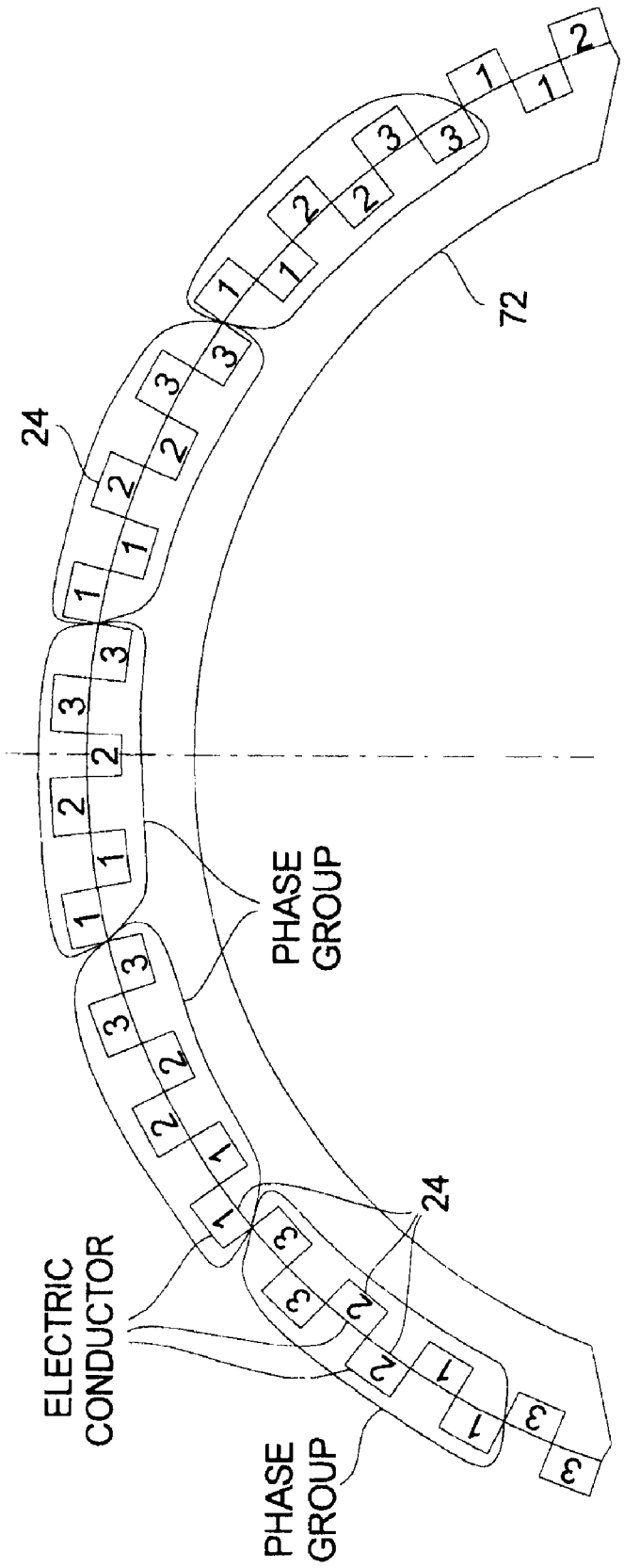
FIGS. 23A-C show the steps in formation of a two-layer wave winding.
Figure 23B:
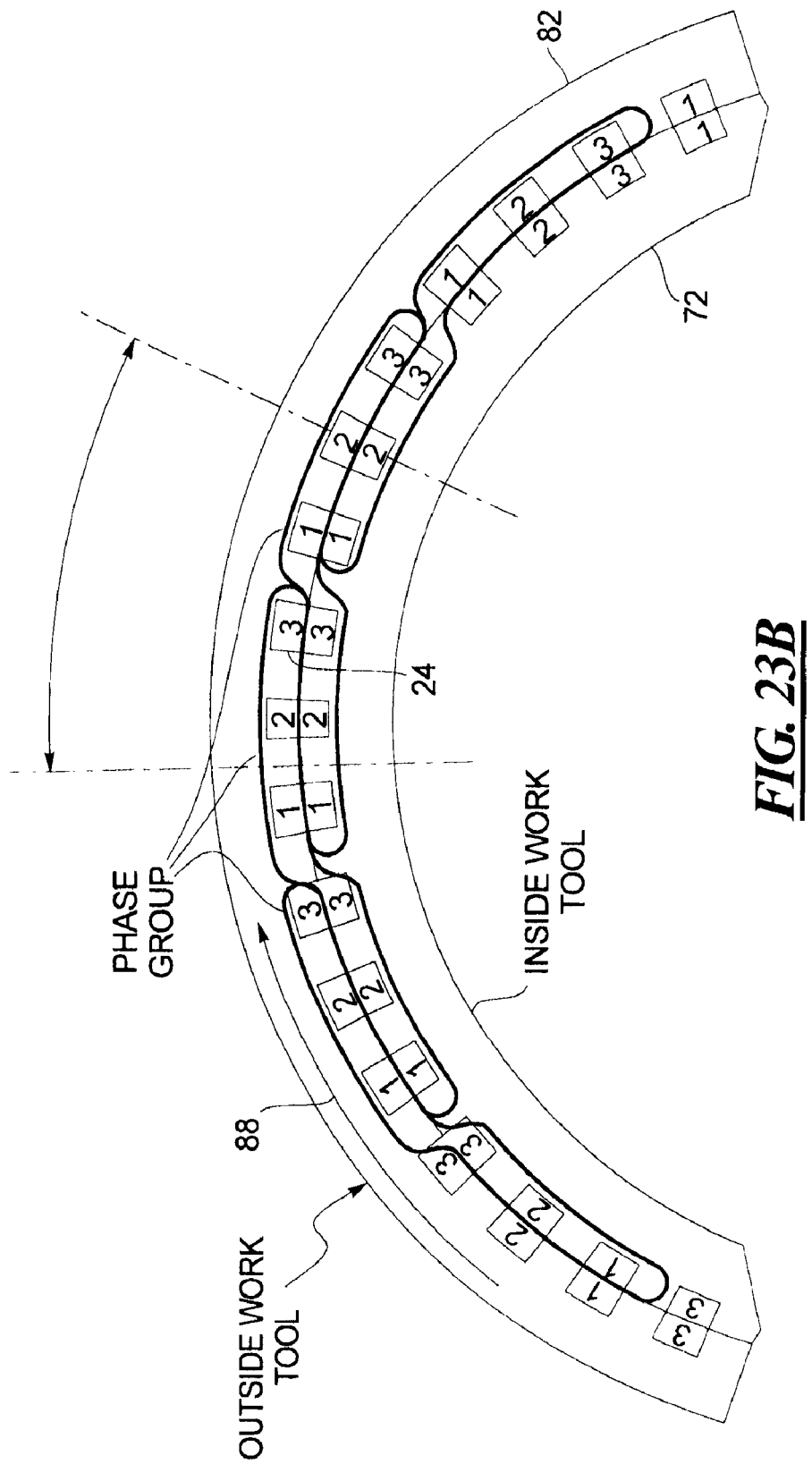
Figure 23C:
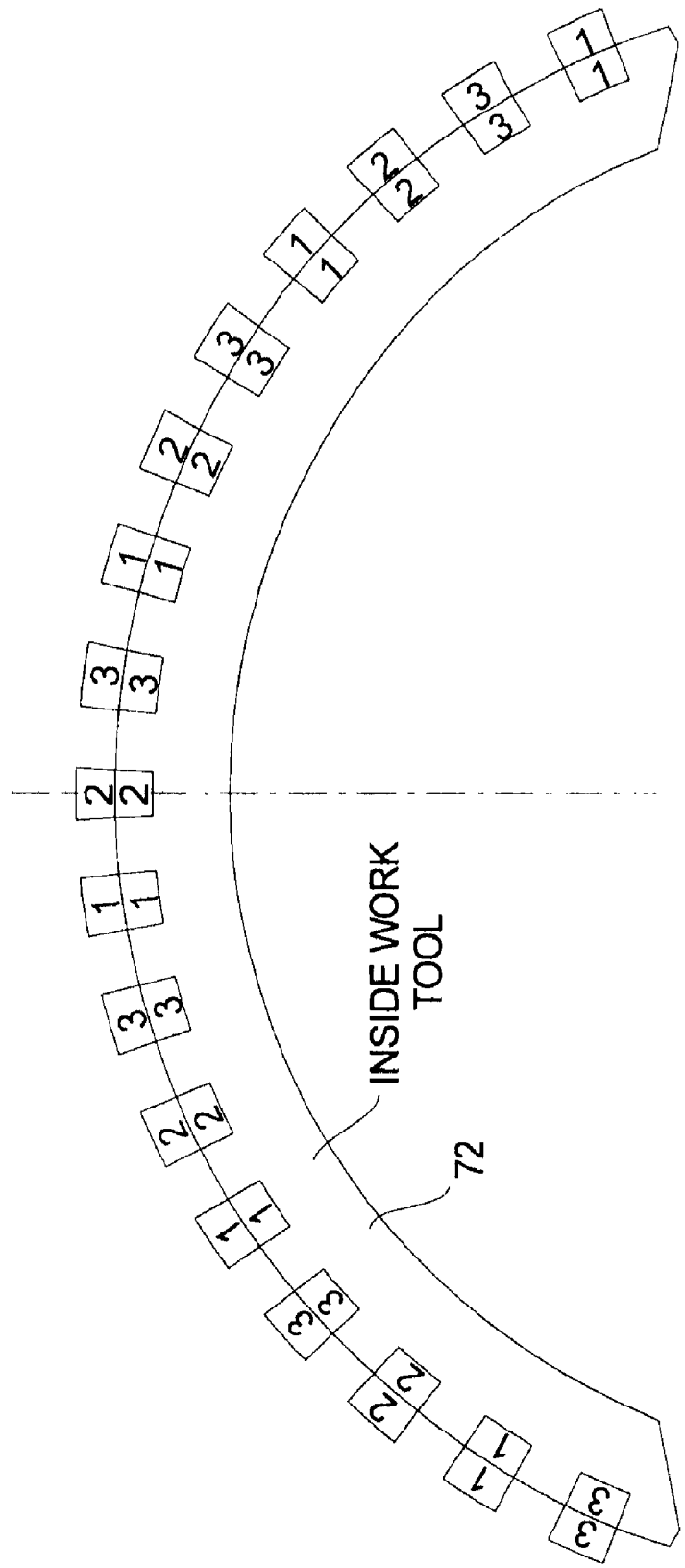
Figure 25A:
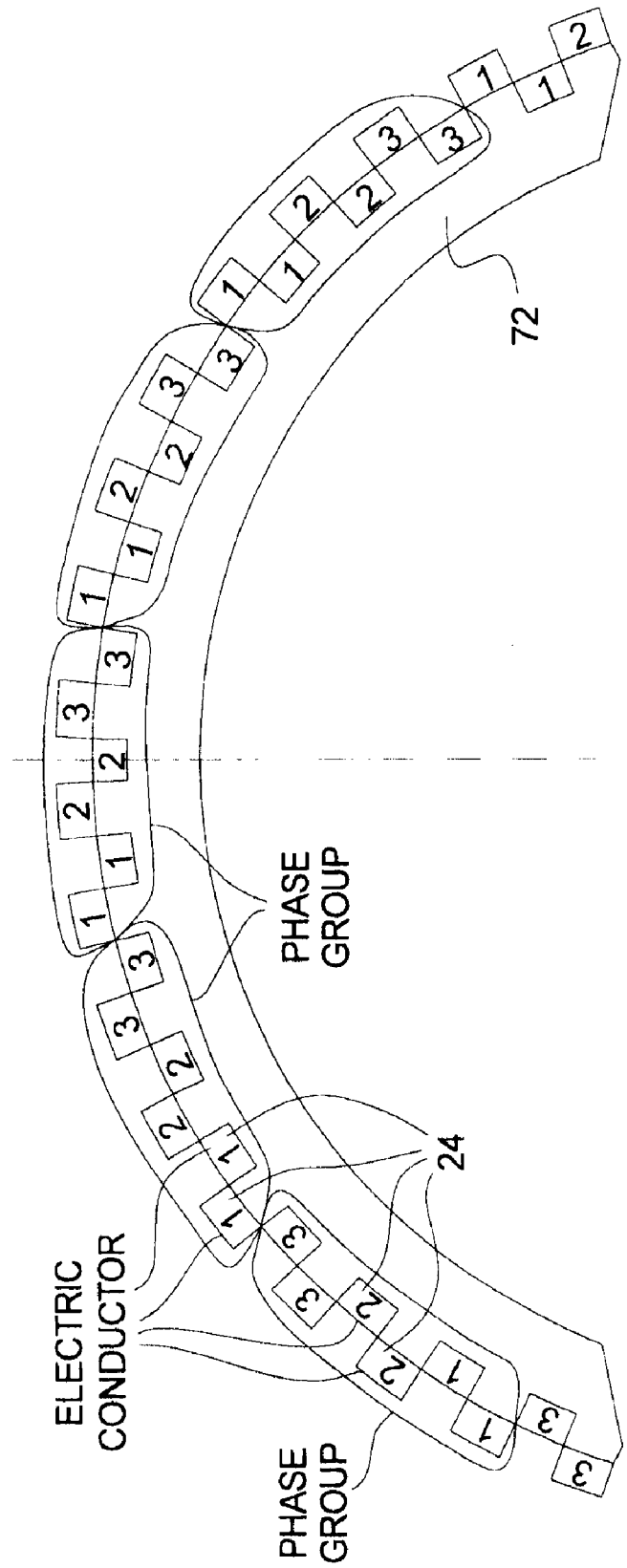
FIGS. 25A-C show the steps in formation of two-layer lap winding.
Figure 25B:
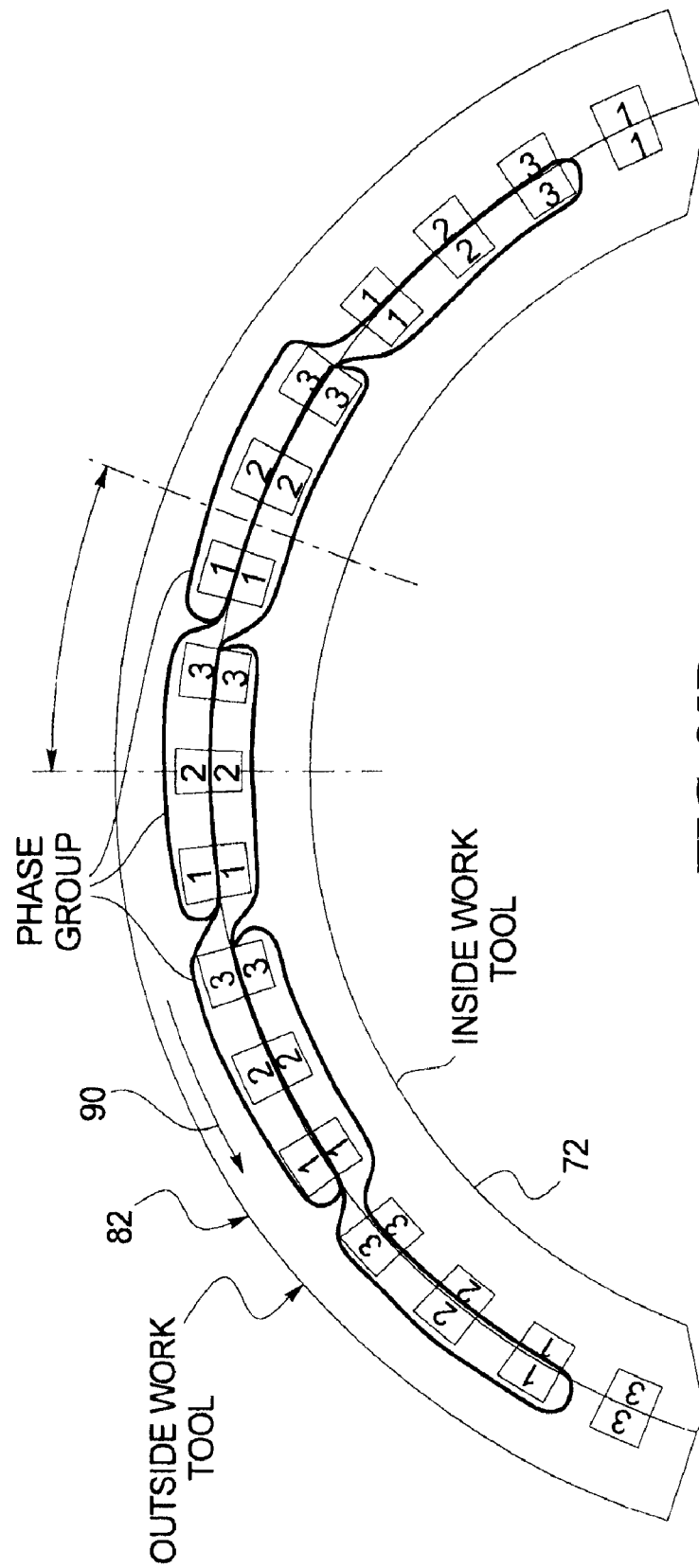
Figure 25C:
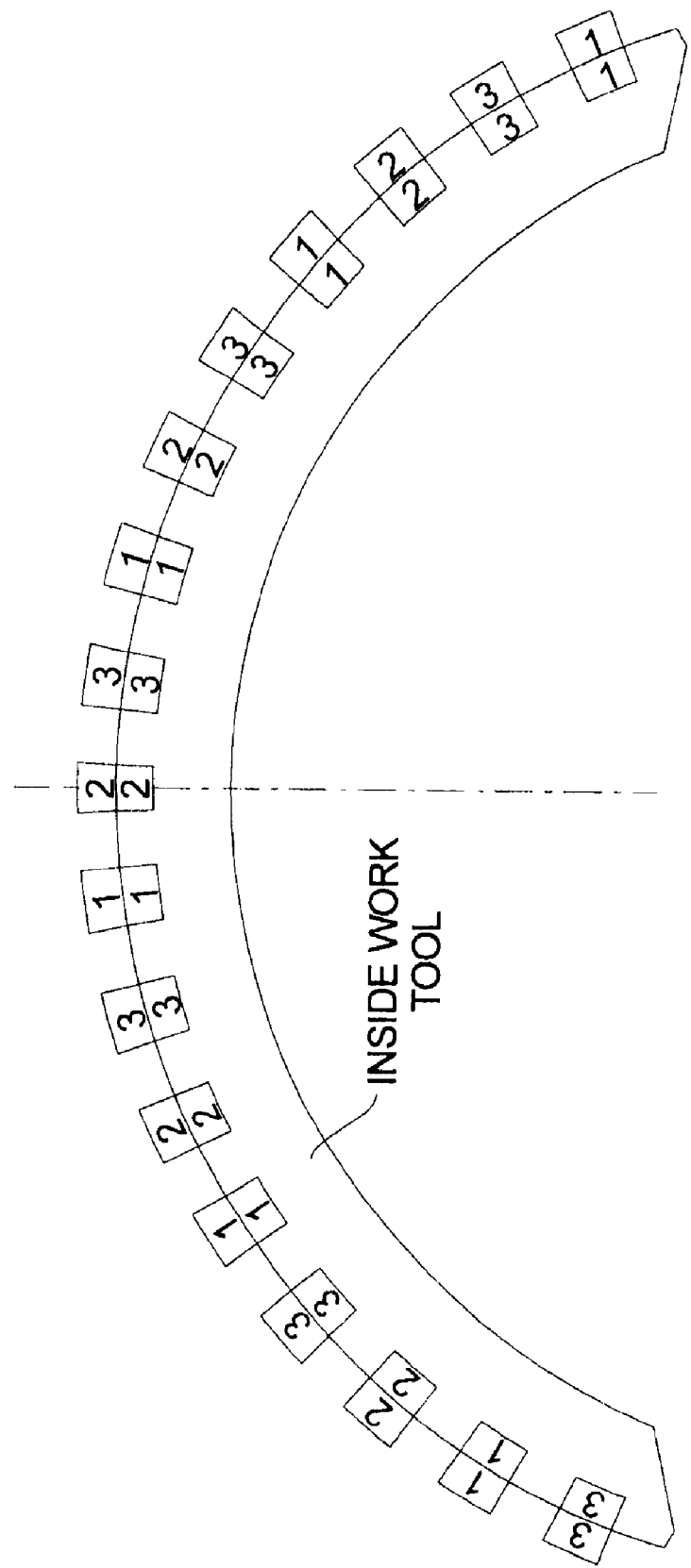

Next, in another embodiment, as shown in FIGS. 23A-C, 24A and B, 25A-C and 26A and B, the divided groups of conductor elements 24 are shown in FIGS. 23A and 25A. The other section of the mandrel tooling 82 or anchor has been fitted over the anchor 72 in FIGS. 23B and 25B. The other section of the mandrel tooling 82 may then be moved relative to the internal section of mandrel tooling 70 a desired extent based on the phase group of the conductor elements 24 and the design of the electro-mechanical machine, such that the central zones of the conductor elements are not deformed and remain aligned in parallel, but the end zones of the conductor elements are deformed as shown in FIGS. 24A and 26A. The extent of movement or twisting angle as shown in FIGS. 23B and 25B is close to the dimension of pole pitch and in other embodiments can be less or more than half of slot pitch. The extent of movement is preferably selected so that the conductor elements that are predetermined to occupy the same slot are superposed in space. As a result, in the embodiment shown in FIGS. 23A and 24A and B, a two-layer wave winding for an armature is formed with movement in direction 88 likewise with the conductor's direction, or in the embodiment shown in FIGS. 25A-C and 26A and B, a two-layer lap winding is formed with movement in direction 90 opposite to conductor's direction.

Figures 27A, 27B, 27C:
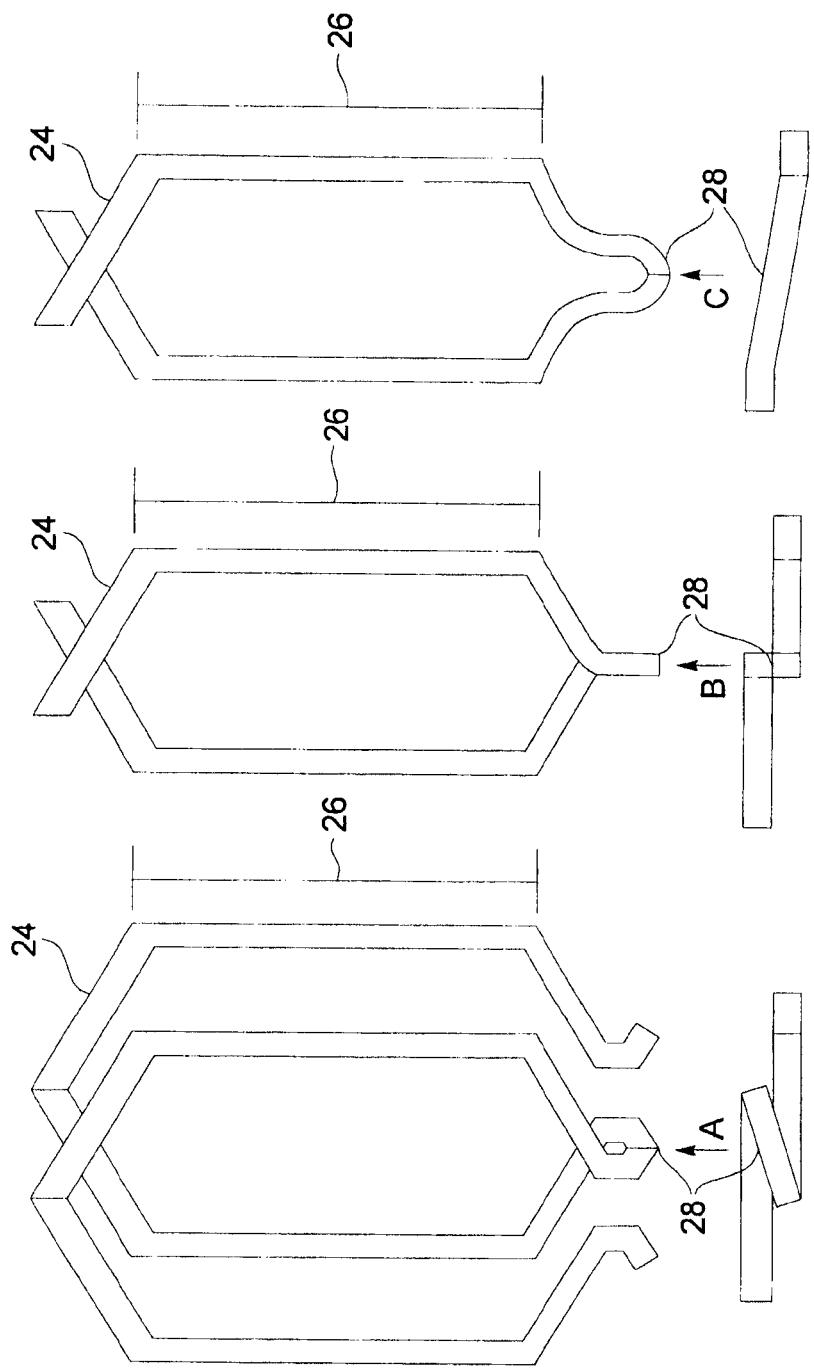
FIGS. 27A-C show the steps in formation of an additional turn to the end zones of the two-layer lap winding.
Figure 28:
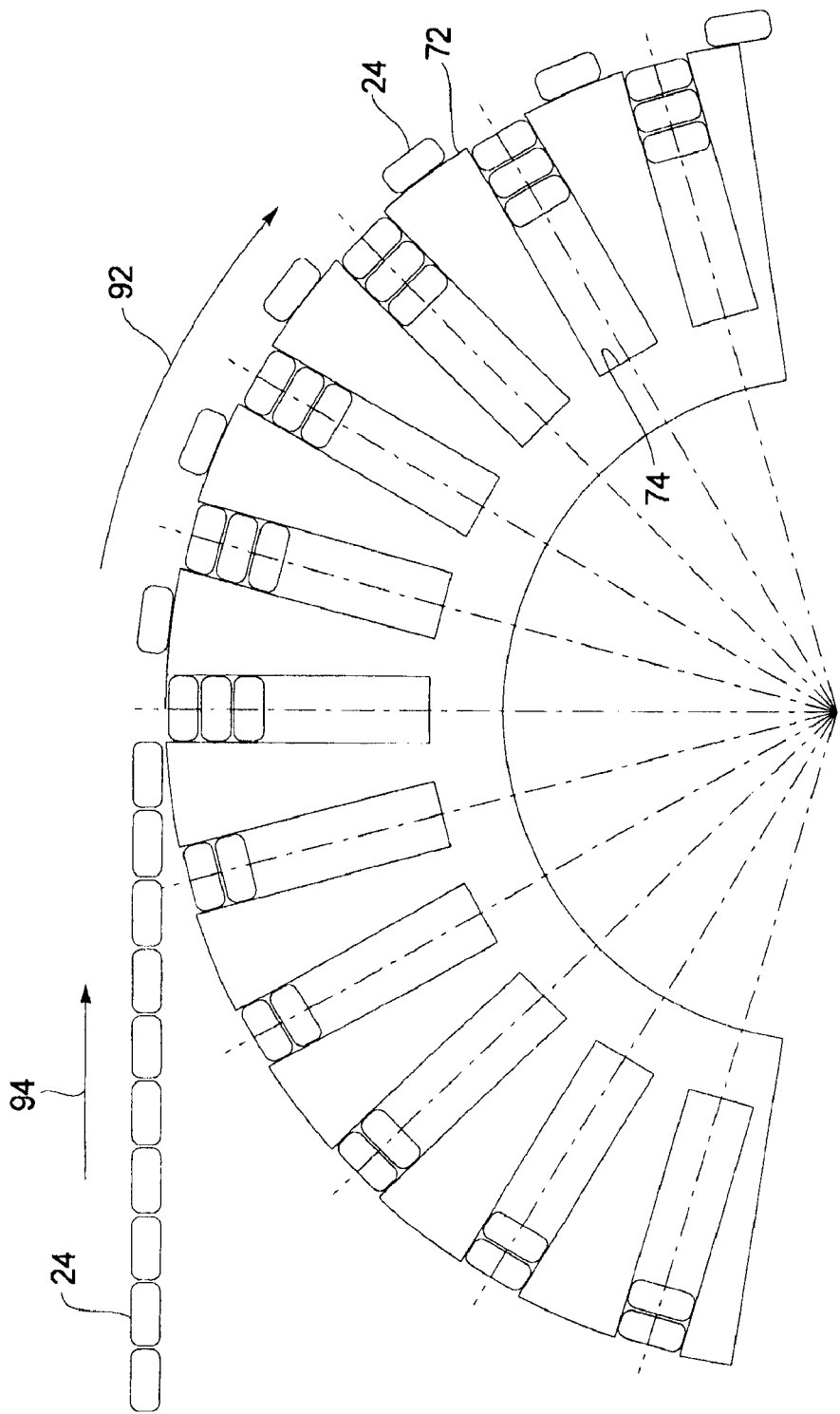
FIG. 28 illustrates a manufacturing process for a multi-layer winding including the formation of third and fourth layers.
Figure 29A:
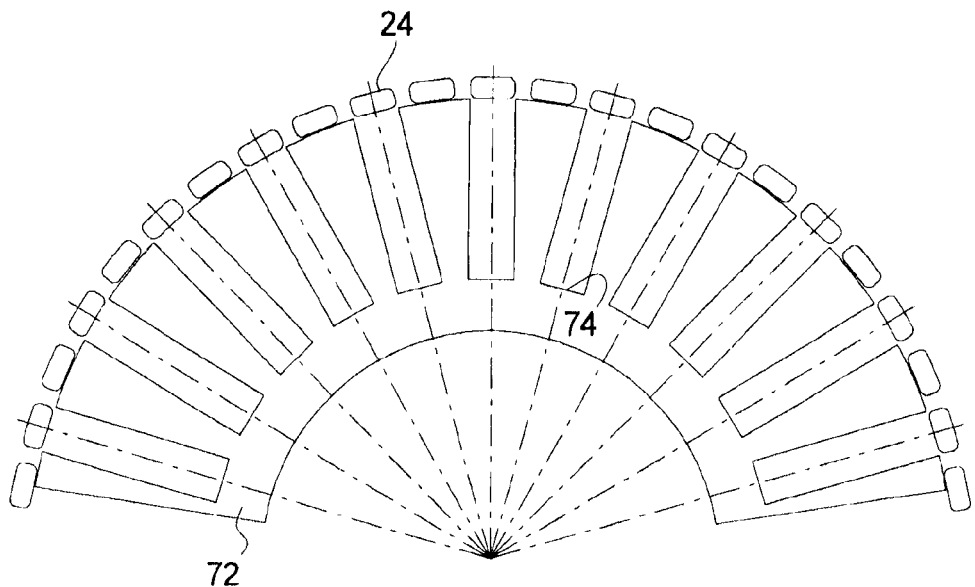
FIGS. 29A-F show formation of a multi-layer winding in a step-by-step process.
Figure 29B:
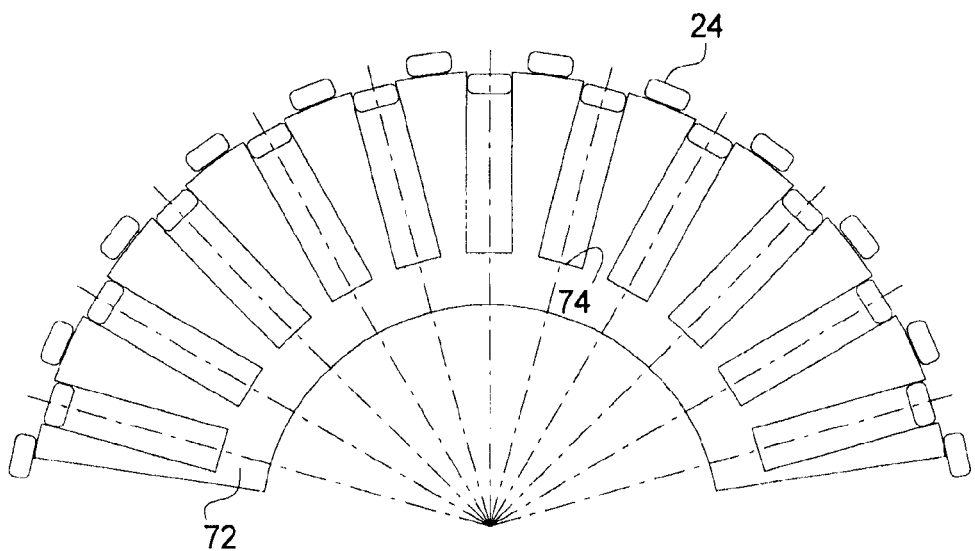
Figure 29C:
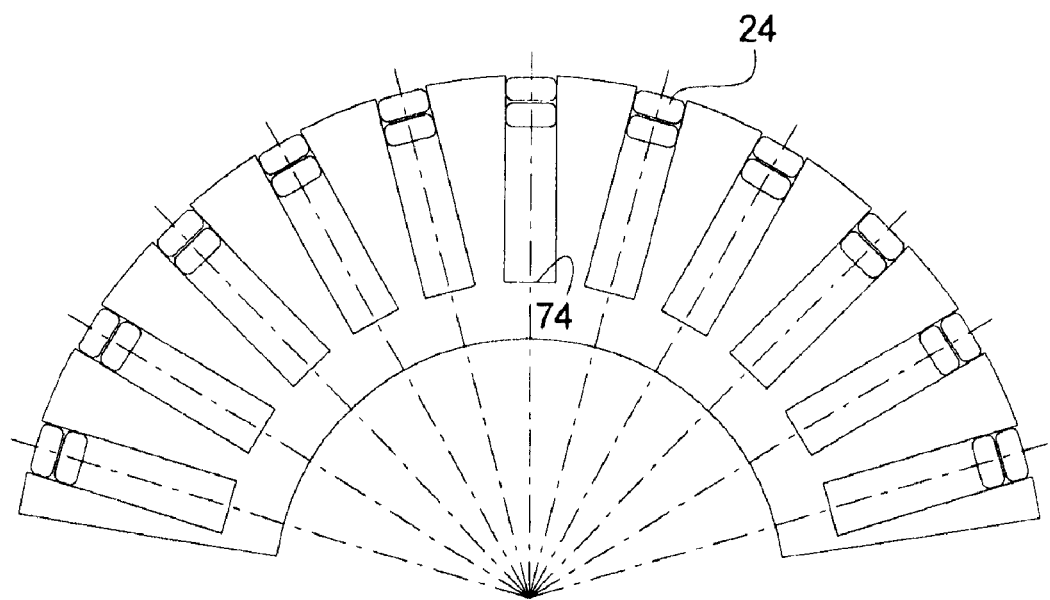
Figure 29D:
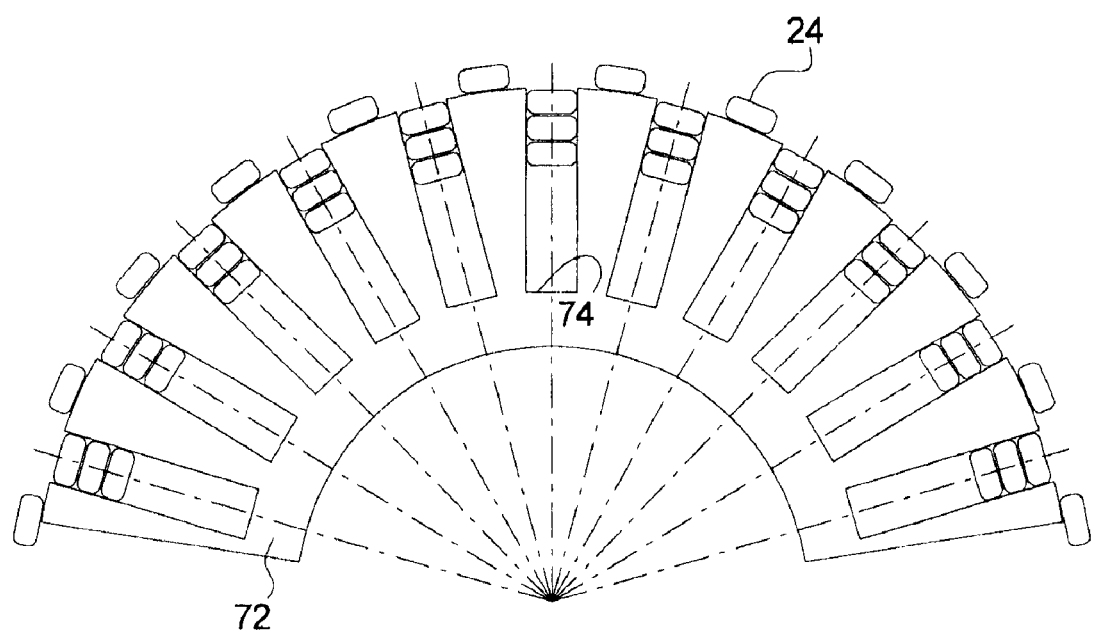
Figure 29E:
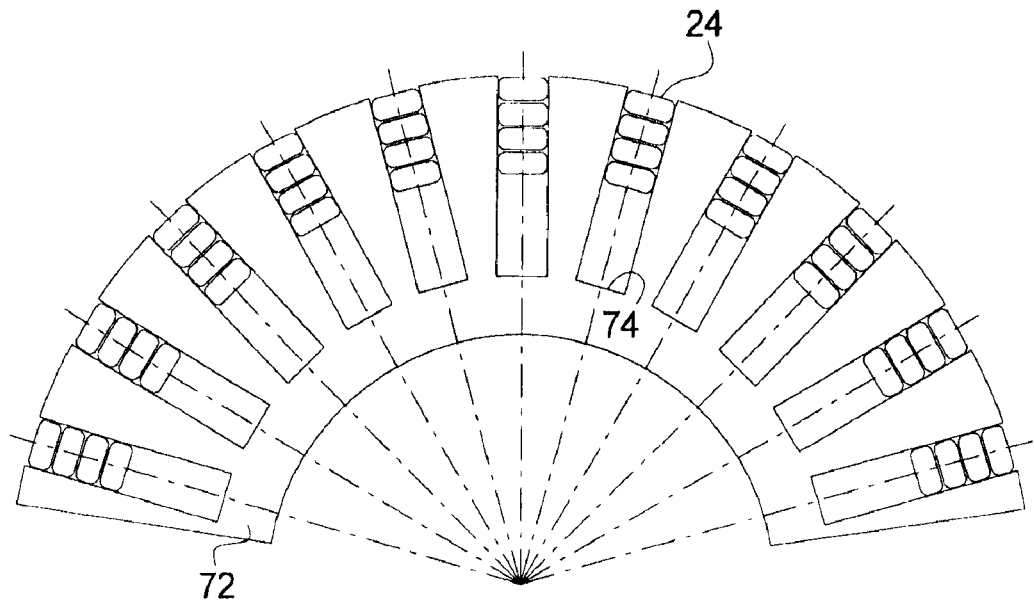
Figure 29F:
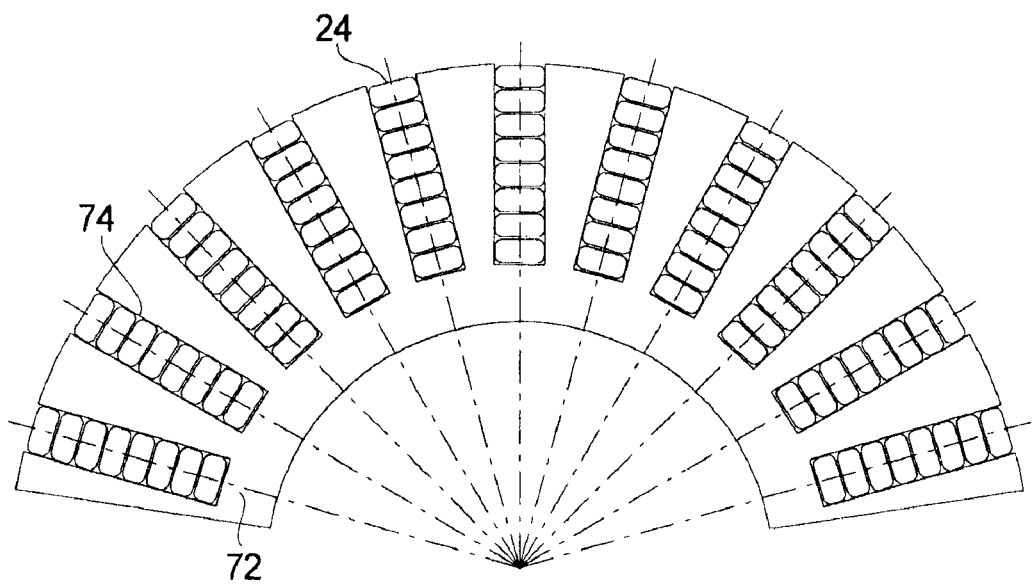

During formation of lap winding, the end zones 28 of the conductor elements 24 are deformed in the direction opposite to conductor placing (to the left in FIG. 27A) such that the end zones 28 cross and are oriented substantially vertical (FIG. 27B) and thereby increase the space occupied by the end zones 28 (as shown in FIGS. 27A and B). This drawback can be overcome by additional rotation of end zones 28 at an angle from 0 to 180 degrees as shown in FIG. 27C.

In other embodiments, a winding may be required with more than two layers. There are several embodiments within this disclosure to address such a requirement. It will be recognized by those of skill in the art that other possible solutions are within the teachings of this disclosure. For example, a multi-layer winding may be manufactured as a combination of two-layer windings manufactured separately, as described above, or as a sequential process. As shown in FIGS. 28, 29A-F and 30A-C, the process described above may be repeated as many times as the number of layers desired divided by two, for example an eight-layer winding should repeat the above process four times. In particular, in FIG. 28, the multi-layer winding is formed by adding one layer of conductor elements 24 at a time to the anchor 72 until the slots 74 are filled. It will be recognized by one of skill in the art that the anchor 72 is rotated in direction 92 as the conductor elements 24 are set in direction 94 so that the conductor elements 24 may be disposed within the slots 74 to create a multi-layer winding. Additionally, in FIGS. 29A-F, a two-layer winding is formed in the process set forth above in FIGS. 29A-C. An additional two-layer winding is further added to the anchor 72 in FIGS. 29D and E. Finally, in FIG. 29F, an additional two-layer winding has been added to the slot 74 of the anchor 72 as set forth in the process steps above. FIGS. 30A-C, respectively, illustrate a view of the end zones of two-, four-, and eight-layer windings manufactured in accordance with the process set forth above.

The mandrel tooling may also be moved in different directions during manufacture of the different layers of a multi-layer winding, one layer of the multi-layer winding is a wave winding and the next layer of the multi-layer winding is a lap winding or any other combination that may enhance the favorable electrical parameters of the electro-mechanical machine.

In another embodiment, a multi-layer winding may be formed by simultaneous or sequential shifts in different layers of a pre-manufactured multi-layer band, such as a three-layer band 20 shown in FIGS. 14C-F.

Figure 31:
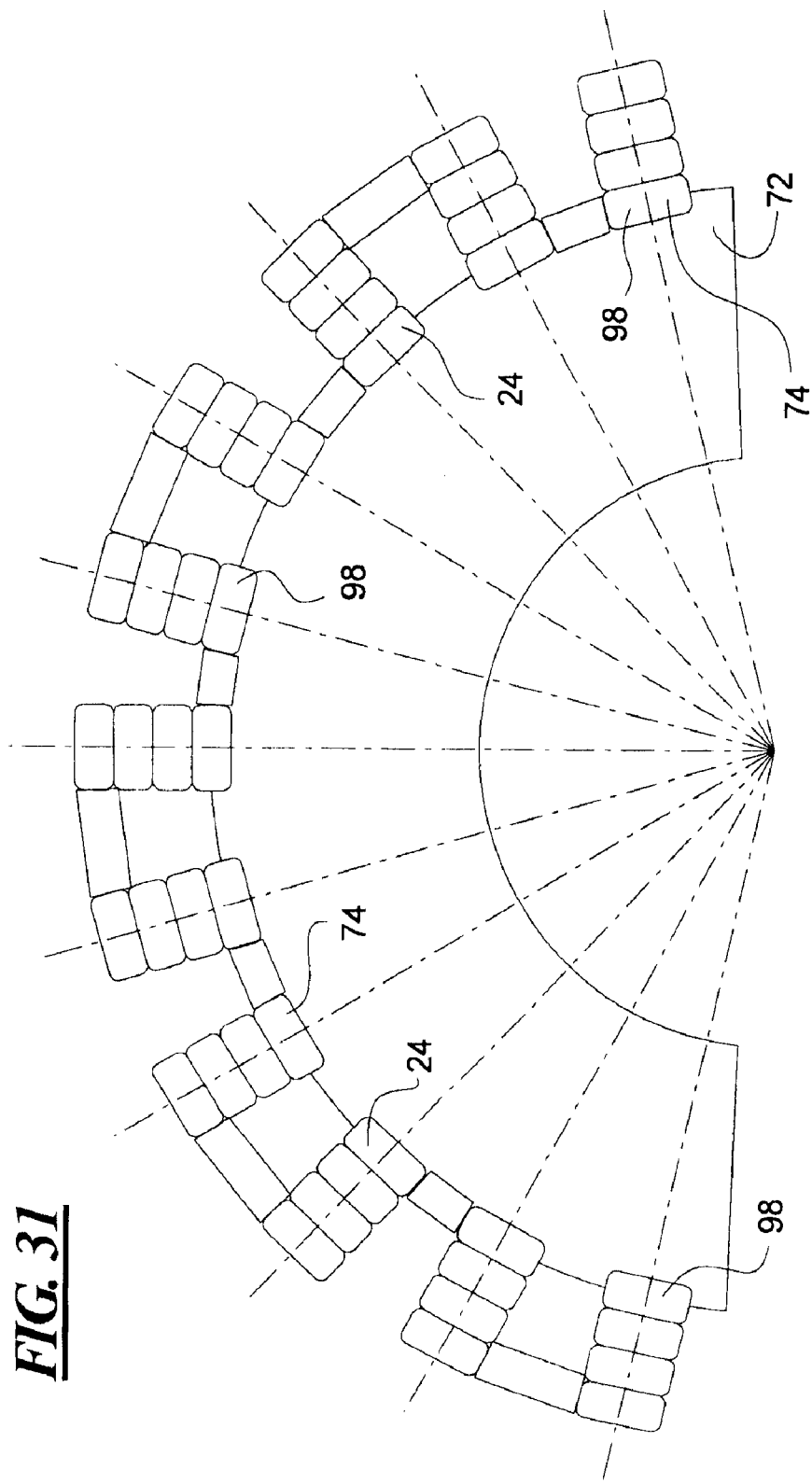
FIG. 31 illustrates the positioning of the multi-layer band on a mandrel or anchor for manufacturing four-layer mixed winding.

The first layer 98 of conductor elements 24 of the band is disposed in slots 74 of an anchor 72 as shown in FIG. 31.

Figure 32A:
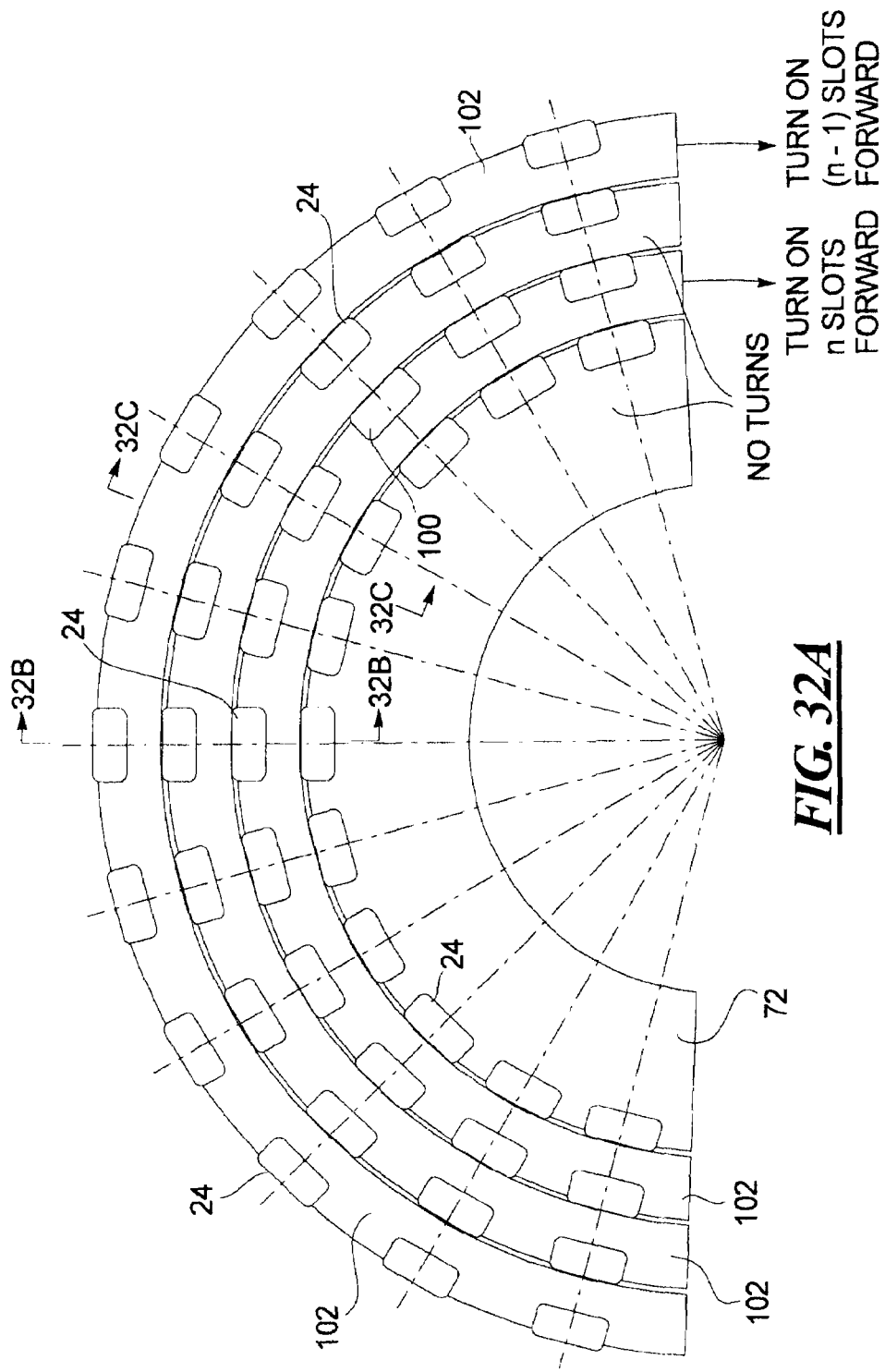
FIGS. 32A-C show multi-layer band of FIG. 31 fitted to the other mandrel tooling to form a four-layer mixed winding.
Figure 32B:
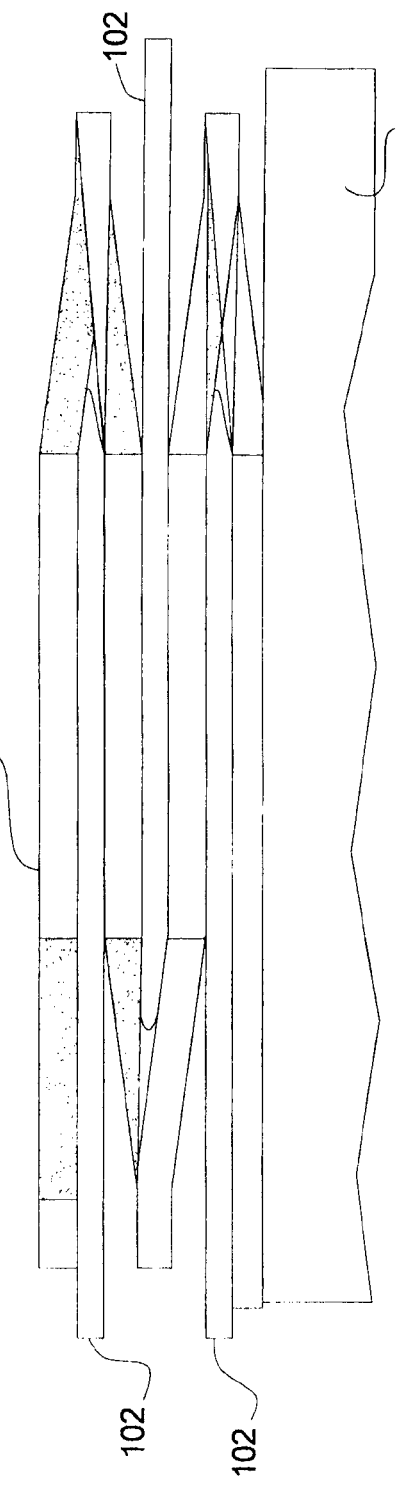
Figure 32C:
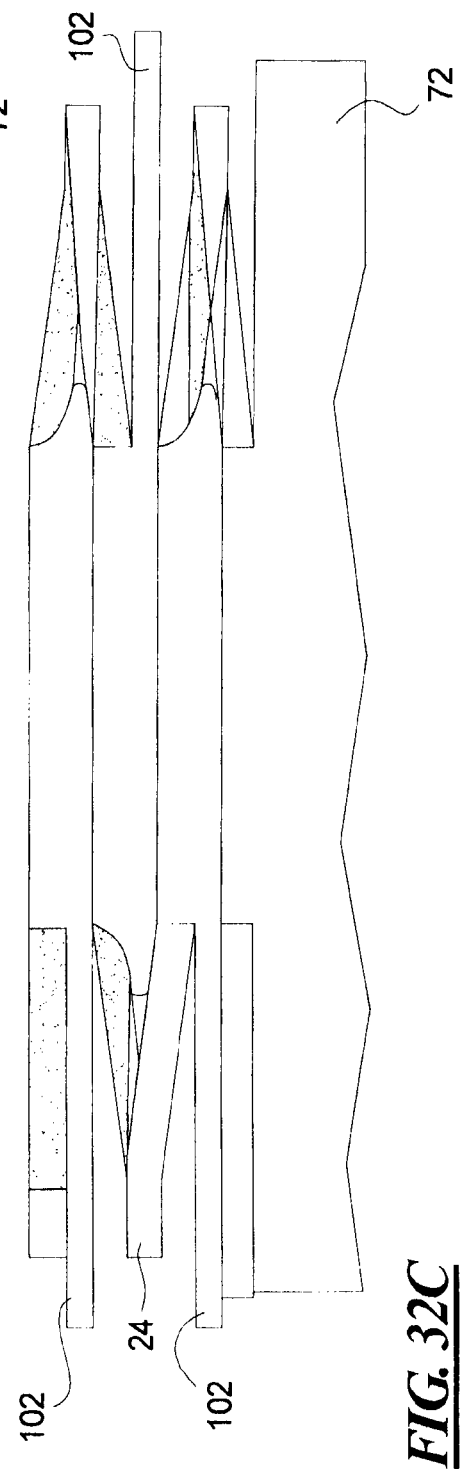

The conductor elements 24 of the other band layers are disposed in slots 100 formed in cylindrical pipe-type mandrels 102 so that the central zones of each of the conductor elements 24 in each layer remain disposed in the respective slots 100 of one of the mandrels 102 as shown in FIGS. 32A-C.

Figure 33A:
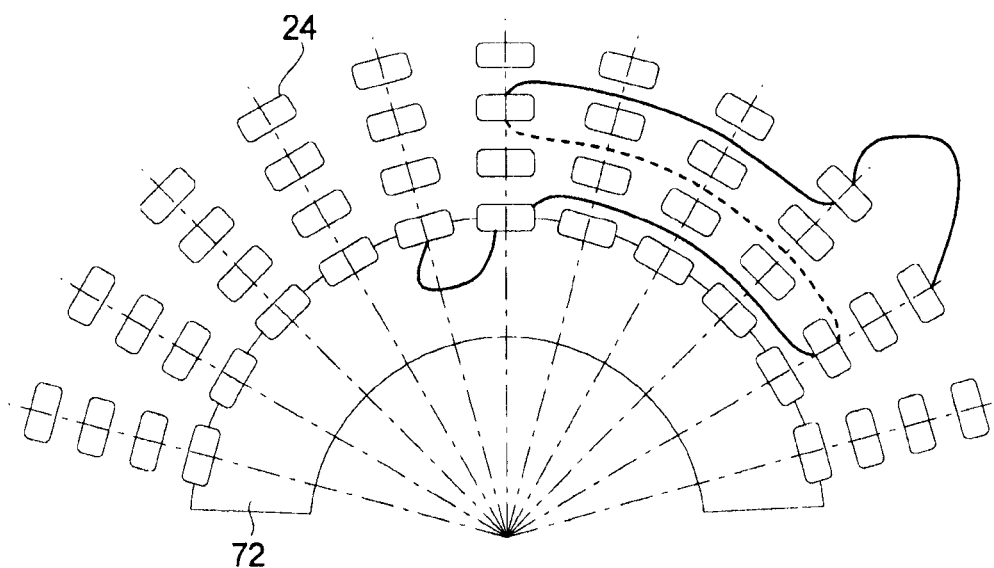
FIGS. 33A and B illustrate electrical connection of the conductor elements in a four-layer mixed winding.
Figure 33B:
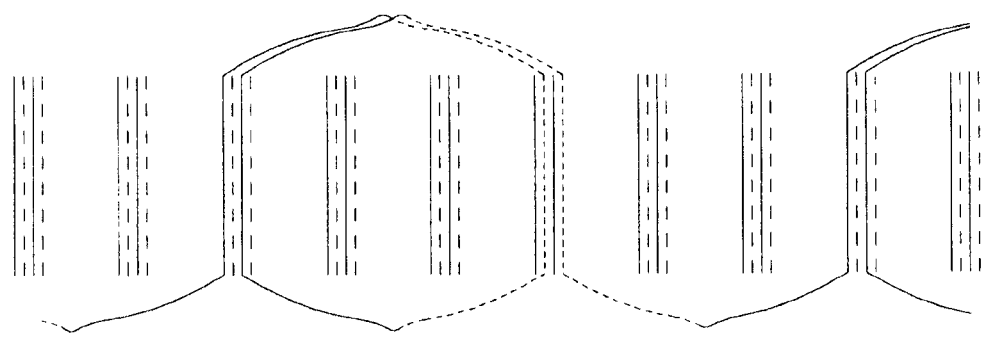
Figure 34A:
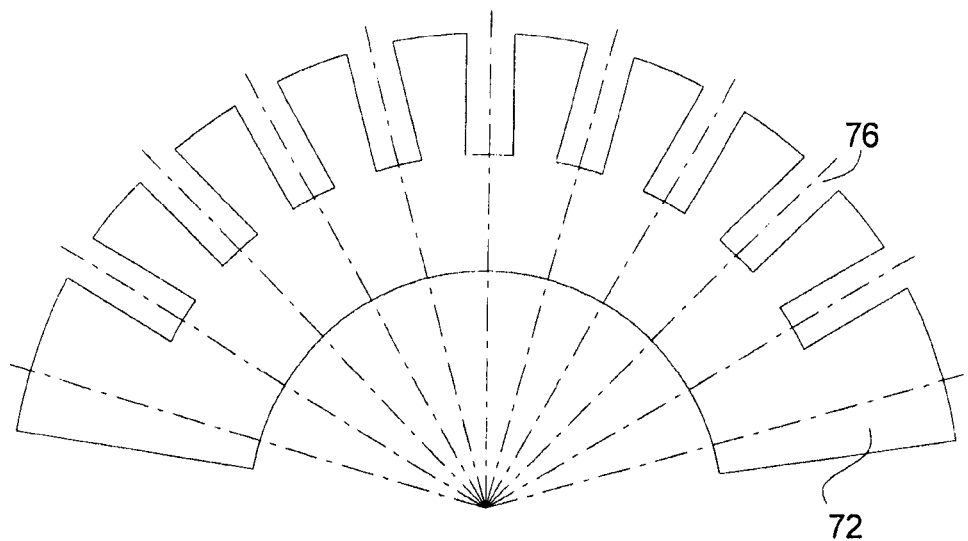
FIGS. 34A-D illustrate the steps in producing a multi-row, multi-layer winding.
Figure 34B:
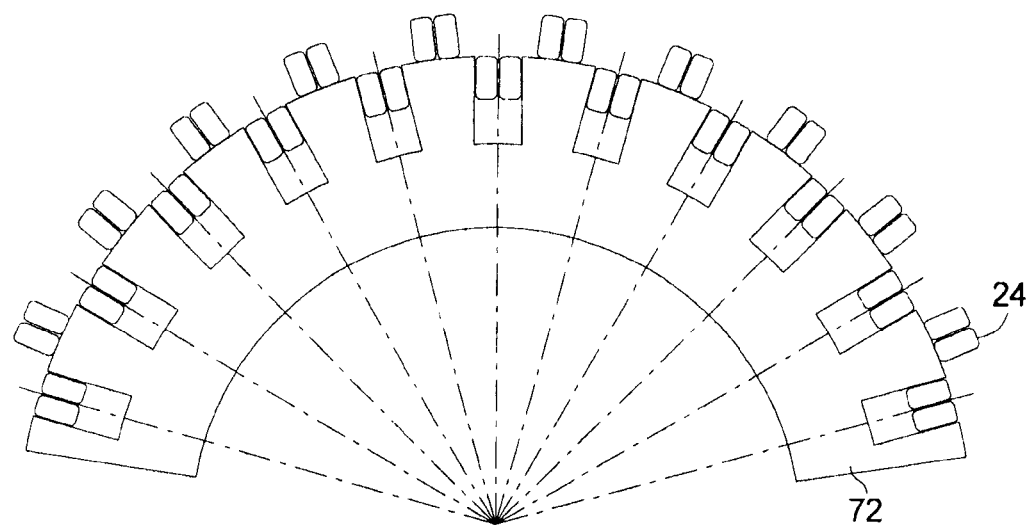
Figure 34C:
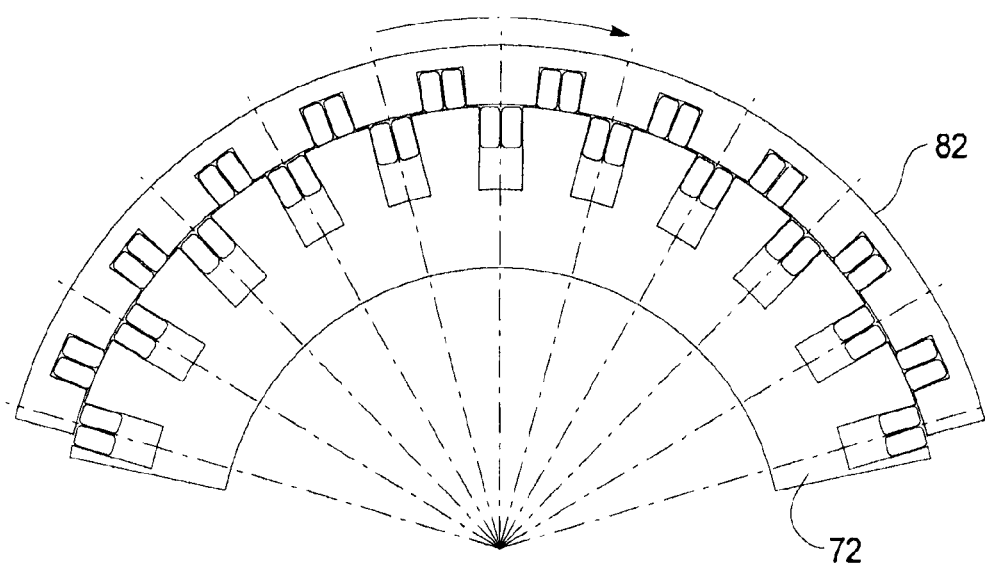
Figure 34D:
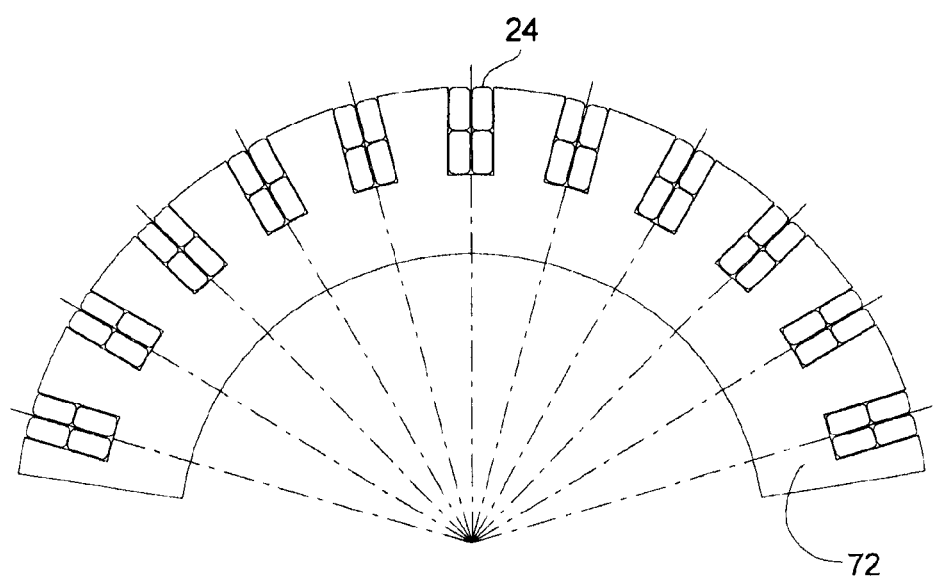

Mandrels 102 or anchor 72 together with conductor elements 24 disposed in the respective slots are moved a predetermined extent so that according to a desired scheme all conductor elements 24 that are to be placed in a given slot of the armature will be positioned one above the other as shown in FIGS. 33A and B.

Figure 35:
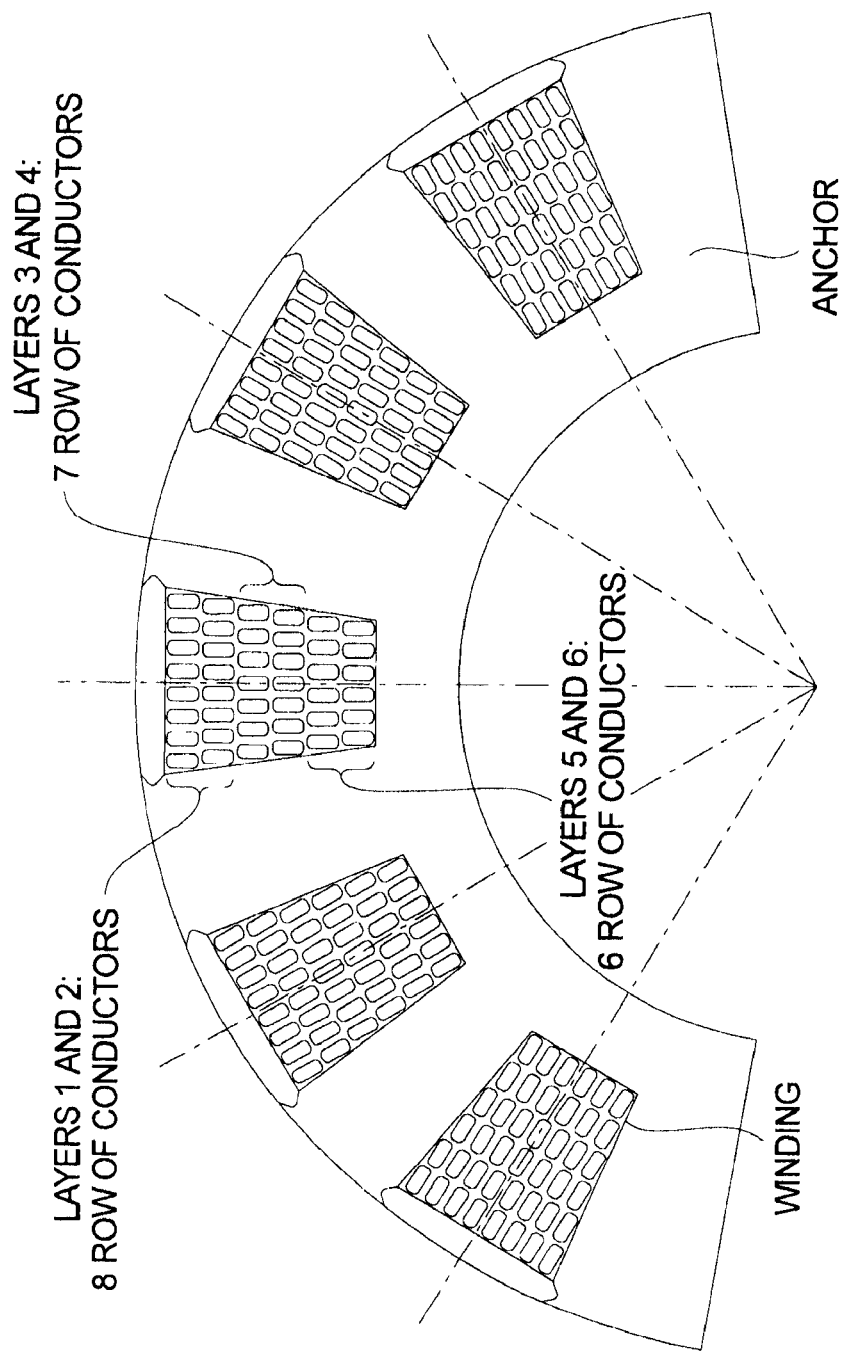
FIG. 35 shows a multi-layer, multi-row winding with a different number of rows in respective layers.
Figures 40A, 40B:
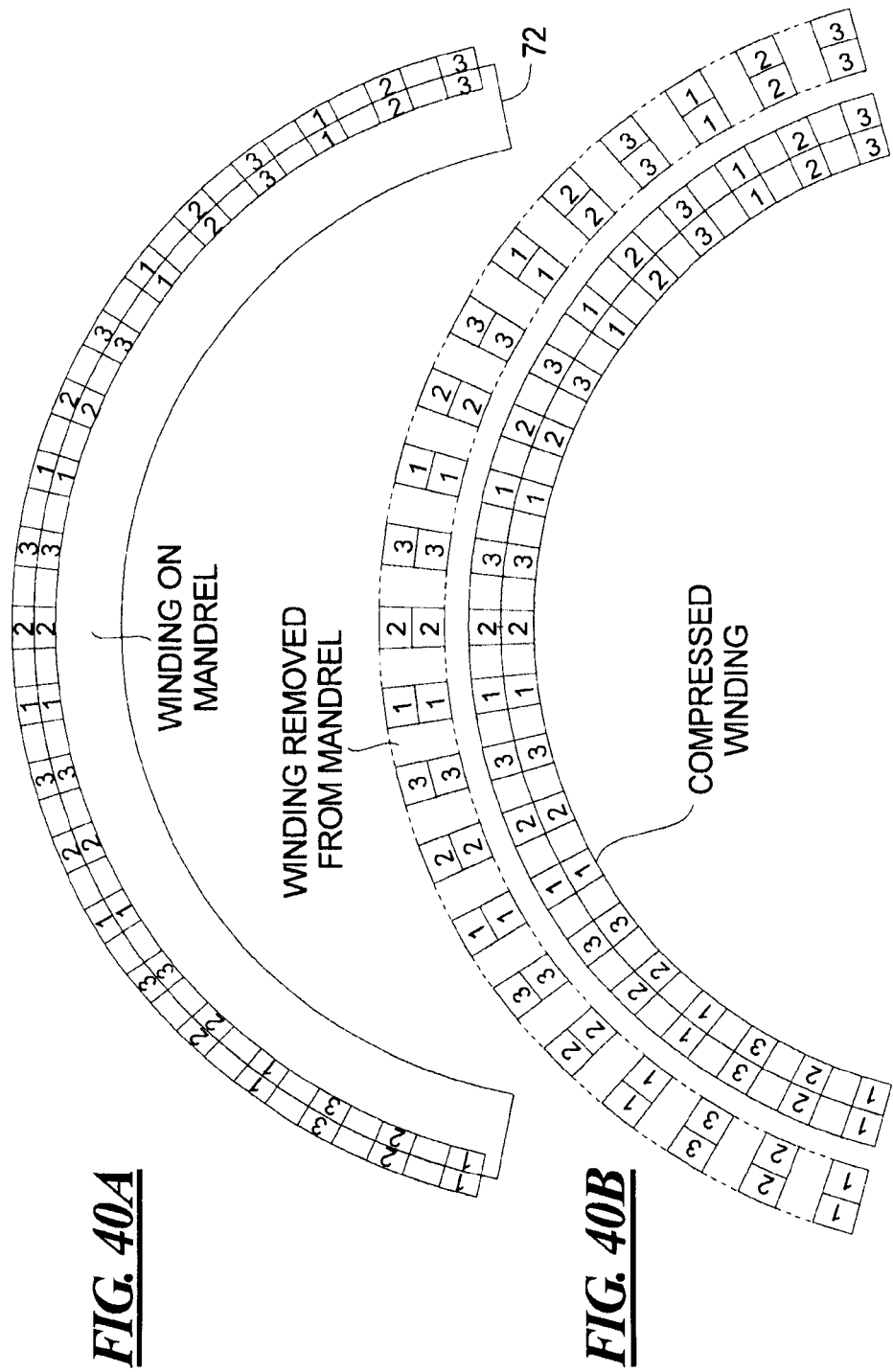
FIGS. 40A-D illustrate a formed winding, compression thereof and installation into an armature.
Figures 40C, 40D:
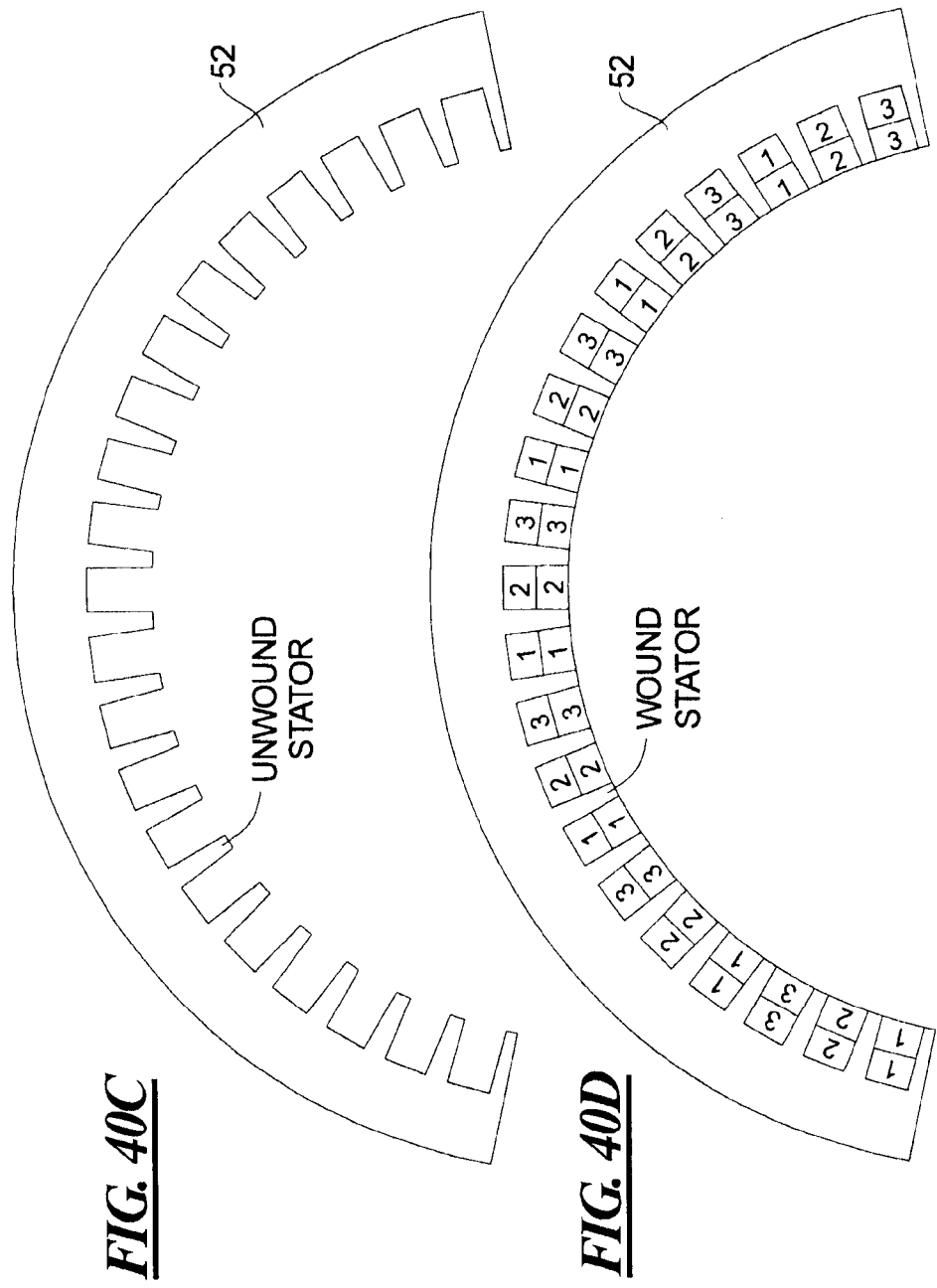
Figure 41A:
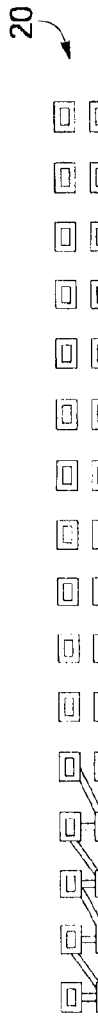
FIGS. 41A-E show one embodiment of the steps in manufacturing a winding from a band of connected conductor elements on a flat mandrel, anchor or armature.
Figure 41B:
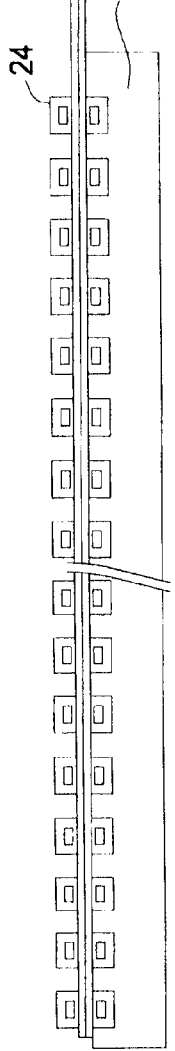
Figure 41C:
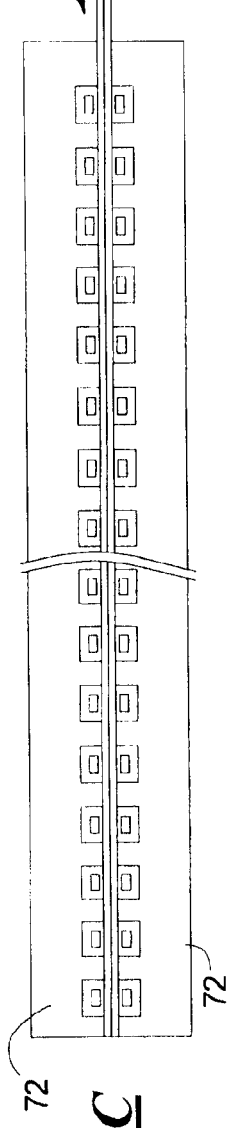
Figure 41D:
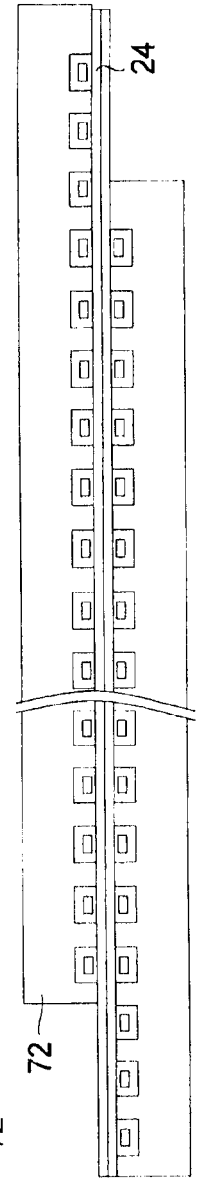
Figure 41E:
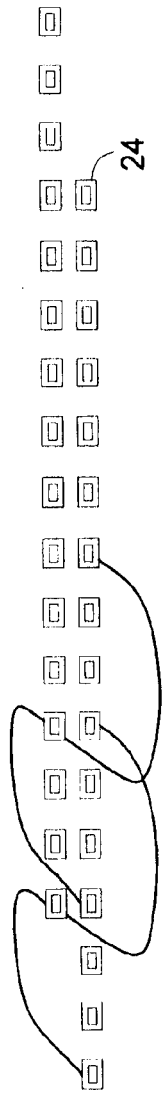

In certain embodiments, as shown in FIGS. 34A-D and 35, a winding with more than one row of conductor elements 24 in each layer is required to be disposed within a slot 76 of the armature. For example, a multi-row winding may be manufactured by disposing in each slot 76 of the anchor 72 more than one conductor in accordance with the process described above and as shown in FIGS. 34A-D. It will be recognized by one of skill in the art that a multi-layer and multi-row winding having different numbers of rows in respective layers may also be manufactured based on this disclosure as shown in FIG. 35. One advantage of these embodiments is an increase in the slot fill relative to conventional constructions.

It is also possible to manufacture winding with preliminary band stretching that will allow for deformation of conductors in the process of winding formation.

In another embodiment, as shown in FIGS. 36A and B, after manufacturing using any method disclosed herein, the band 20 may be stretched or expanded to create required gaps between sequential conductor elements 24 and formation of the end zones 28 of the winding. Stretching or expanding may be in a direction perpendicular to the longitudinal axis of the conductor elements in the central zone 26 so that the central zones 26 are displaced parallel and the end zones 28 are deformed so that the central zones 26 of different conductor elements 24 reside in predetermined positions relative to one another.

The stretched or expanded band 20 may then be disposed on the anchor or cylindrical mandrel 72 for winding as shown in FIG. 37. The anchor or mandrel 72 has slots 76 corresponding to slots of the armature 52 that the predetermined conductor element 24 is intended to be associated with, and the teeth 74 between slots 76 are generally configured to have a dimension not less than a slot width. As described above with respect to disposing the band over the anchor or mandrel 72, the conductor elements 24 are oriented so that those extending in one direction are positioned above the slots 76 while the conductor elements 74 extending in the opposite directions are placed on the teeth between slots as shown in FIG. 37.

In one embodiment, the mandrel, anchor or armature may be moved around its axis "K" times where "K" is calculated according to the formula below:

$$K = F \times N$$

Where

F=number of phases

N=number of conductors per pole and phase

During this process, conductor elements may be divided into at least two groups: one including conductor elements to be placed in slots; and the other from conductor elements to be placed between slots on the teeth 74. Another section of mandrel tooling 82 may be disposed (as shown in FIGS. 20-22) on the conductor elements 24 disposed on the teeth 74, so that the mandrels may be moved relative to one another equal to half of slot pitch such that predetermined conductors to be placed in the same slot are in superposition while ensuring that central zones of conductor elements are fixed while end zones are deformed resulting in a two-layer wave winding similar to that shown in FIGS. 23 and 24.

In other embodiments, as shown in FIG. 38, the process for band manufacturing and placement or insertion may be combined, or the process for band manufacturing, placement and formation (at least partially) may also be combined. For example, a conductor element 24 having a required cross-section may be placed directly on the surface of a mandrel, anchor or armature 72 for winding as shown in FIG. 38. In one embodiment, the mandrel 72 may be turned, as shown by arrow 106, in the desired direction as the dispensing roll 108 is moved back and forth, as shown by arrow 110, and the mandrel is also moved, as shown by arrow 112 so that the end zones 28 of the conductor elements 24 may be formed.

In another embodiment, a band 20 may be formed on a mandrel, as shown in FIGS. 39A and B, using any method described above and as a result is highly flexible because of the rhomboid shaped sections. The band 20 may be removed from the mandrel and transferred into an armature 52 as shown in FIGS. 40A-D. Between the band removal and its placement into the armature 52, it is possible to perform several auxiliary operations, for example insulation of conductor elements 24 in any suitable manner, improving the end zone shape, making compensating connections, winding tap connections, compressing the winding (FIGS. 40B and 39B), etc.

Significant simplification of the above described methods may be especially useful in the production of medium scale electro-mechanical machines, wherein the band 20 may be manufactured in the form of a flat winding by placing the band in one of the above described ways on a flat mandrel (see FIGS. 41A-E and FIGS. 42A-D), moving conductor elements 24 relative to one another, removing the band 20 from mandrel 72, folding the band 20 into a circle (as shown in FIGS. 43A-C) (which is easy because of high flexibility of the band 20) and inserting the winding into the armature of the electro-mechanical machine as described above with respect to FIG. 39.

Furthermore, while the particular preferred embodiments have been shown and described, it will be obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

What is claimed is:

1. A method for manufacturing a winding for an armature of an electro-mechanical machine having slots formed therein, the method comprising the steps of:

(a) manufacturing a band of connected conductor elements having at least one layer;

wherein after the band having at least one layer of connected conductor elements is formed, the band is expanded in a direction perpendicular to a longitudinal axis of the conductor elements in a central zone so that the central zones of the conductor elements are displaced parallel in predetermined orientation relative to one another;

(b) configuring, selectively, the conductor elements of each layer of the band to a predetermined alignment orientation with respect to the slots of the armature of the electro-mechanical machine;

(c) disposing the band on a mandrel tooling, wherein the conductor elements of the band each include a central zone and a pair of end zones disposed at opposing ends of the central zone;

(d) defining at least two groups of the conductor elements, the conductor elements central zones of each group disposed in slots of a corresponding section of the mandrel tooling, such that the conductor elements central zones are fixed therein so that displacement of the central zones in a direction perpendicular to a longitudinal axis of the conductor elements in the central zone is prevented;

(e) moving the corresponding sections of the mandrel tooling relative to one another in a predetermined direction perpendicular to the longitudinal axis of the conductor elements in the central zone so that the central zones of conductor elements from different groups are disposed in a predetermined orientation relative to one another to define the winding;

(f) moving the formed winding from the mandrel tooling for disposition into predetermined slots of the armature of the electro-mechanical machine, wherein the mandrel tooling includes a set of linear elements for a flat winding; and (g) disposing the configured conductor elements into predetermined slots of the armature of the electro-mechanical machine.

2. The method as recited in claim 1, wherein the conductor elements have a cross-section selected from the group consisting of tetragon, trapezium, trapezoid, parallelogram, rhombus, rectangle, deltoid or square.

3. The method as recited in claim 2, wherein the conductor elements have a relief formed on at least one longitudinal edge.

4. The method as recited in claim 2, wherein the conductor elements have different dimensional configurations.

5. The method as recited in claim 4, wherein each conductor element has a first width substantially similar to a second width of the slot of the armature where such conductor element is disposed.

6. The method as recited in claim 1, wherein the conductor elements have openings formed therein to provide air passages.

7. The method as recited in claim 1, wherein an electrical insulation material is applied to the conductor elements after the winding is defined.

8. The method as recited in claim 1, wherein more than one conductor element is disposed in each slot.

9. The method as recited in claim 1, wherein the winding includes a plurality of two-layer bands disposed sequentially in the slots of the armature.

10. A method for manufacturing a winding for an armature of an electro-mechanical machine having slots formed therein, the method comprising the steps of
 (a) manufacturing a band of connected conductor elements having at least one layer;
 (b) configuring, selectively, the conductor elements of each layer of the band to a predetermined alignment orientation with respect to the slots of the armature of the electro-mechanical machine;
 (c) disposing the band on a mandrel tooling, wherein the conductor elements of the band each include a central zone and a pair of end zones disposed at opposing ends of the central zone;
 (d) defining at least two groups of the conductor elements, the conductor elements central zones of each group disposed in slots of a corresponding section of the mandrel tooling, such that the conductor elements central zones are fixed therein so that displacement of the central zones in a direction perpendicular to a longitudinal axis of the conductor elements in the central zone is prevented;
 (e) moving the corresponding sections of the mandrel tooling relative to one another in a predetermined direction perpendicular to the longitudinal axis of the conductor elements in the central zone so that the central zones of conductor elements from different groups are disposed in a predetermined orientation relative to one another to define the winding;
 (f) moving the formed winding from the mandrel tooling for disposition into predetermined slots of the armature of the electro-mechanical machine, wherein the mandrel tooling includes a set of linear elements for a flat winding; and
 (g) disposing the configured conductor elements into predetermined slots of the armature of the electro-mechanical machine, wherein the winding includes a plurality of two-layer bands disposed sequentially in the slots of the armature, and wherein the conductor elements of each of the plurality of two-layer bands are configured with different dimensions.

11. The method as recited in claim 10, wherein each of the plurality of two-layer bands disposed in each slot has a different number of conductor elements.

12. A method as recited in claim 10, wherein adjacent conductor elements are disposed such that end zones of the conductor elements of one of the groups of conductor elements are deformed in one direction and the conductor elements of another of the groups of conductor elements have end zones deformed in another direction.

* * * * *

UNITED STATES PATENT AND TRADEMARK OFFICE
CERTIFICATE OF CORRECTION

PATENT NO. : 7,631,413 B2 Page 1 of 1
APPLICATION NO. : 11/279041
DATED : December 15, 2009
INVENTOR(S) : Bullock et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 410 days.

Signed and Sealed this

Second Day of November, 2010

David J. Kappos
*Director of the United States Patent and Trademark Office*